(12) United States Patent
Monroe

(10) Patent No.: US 6,802,878 B1
(45) Date of Patent: Oct. 12, 2004

(54) ABRASIVE PARTICLES, ABRASIVE ARTICLES, AND METHODS OF MAKING AND USING THE SAME

(75) Inventor: Larry D. Monroe, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/417,590

(22) Filed: Apr. 17, 2003

(51) Int. Cl.[7] .............................. B24D 3/00; C09K 3/14
(52) U.S. Cl. ............................ 51/307; 51/309; 51/295; 51/298; 51/293; 451/28
(58) Field of Search .......................... 51/307, 309, 295, 51/298, 293; 451/28

(56) References Cited

U.S. PATENT DOCUMENTS

| | | |
|---|---|---|
| 4,881,951 A | 11/1989 | Wood et al. |
| 4,964,883 A | 10/1990 | Morris et al. |
| 5,011,508 A | 4/1991 | Wald et al. |
| 5,102,429 A | 4/1992 | Wald et al. |
| 5,139,978 A | 8/1992 | Wood |
| 5,164,348 A | 11/1992 | Wood |
| 5,201,916 A | 4/1993 | Berg et al. |
| 5,213,591 A | 5/1993 | Celikkaya et al. |
| 5,217,933 A | 6/1993 | Budd et al. |
| 5,219,806 A | 6/1993 | Wood |
| 5,282,875 A | 2/1994 | Wood et al. |
| 5,312,789 A | 5/1994 | Wood |
| 5,348,918 A | 9/1994 | Budd et al. |
| 5,352,254 A | 10/1994 | Celikkaya |
| 5,366,523 A | 11/1994 | Rowenhorst et al. |
| 5,429,647 A | 7/1995 | Larmie |
| 5,431,705 A | 7/1995 | Wood |
| 5,474,583 A | 12/1995 | Celikkaya |
| 5,489,204 A | 2/1996 | Conwell et al. |
| 5,489,318 A | 2/1996 | Erickson et al. |
| 5,496,386 A | 3/1996 | Broberg et al. |
| 5,498,269 A | 3/1996 | Larmie |
| 5,516,348 A | 5/1996 | Conwell et al. |
| 5,527,369 A | 6/1996 | Garg |
| 5,547,479 A | 8/1996 | Conwell et al. |
| 5,551,959 A | 9/1996 | Martin et al. |
| 5,551,963 A | 9/1996 | Larmie |
| 5,551,964 A | 9/1996 | Wood |
| 5,567,150 A | 10/1996 | Conwell et al. |
| 5,584,896 A | 12/1996 | Broberg et al. |
| 5,593,467 A | 1/1997 | Monroe |
| 5,611,828 A | 3/1997 | Celikkaya |
| 5,611,829 A | 3/1997 | Monroe et al. |
| 5,628,806 A | 5/1997 | Celikkaya et al. |
| 5,641,330 A | 6/1997 | Celikkaya et al. |
| RE35,570 E | 7/1997 | Rowenhorst et al. |
| 5,645,618 A | 7/1997 | Monroe et al. |
| 5,645,619 A | 7/1997 | Erickson et al. |
| 5,651,801 A * | 7/1997 | Monroe et al. ............... 51/309 |
| 5,653,775 A * | 8/1997 | Plovnick et al. ............... 51/309 |
| 5,660,604 A | 8/1997 | Wood |
| 5,669,941 A | 9/1997 | Peterson |
| 5,690,707 A | 11/1997 | Wood et al. |
| 5,707,409 A | 1/1998 | Martin et al. |
| 5,752,996 A | 5/1998 | Wood |
| 5,776,214 A | 7/1998 | Wood |
| 5,779,743 A | 7/1998 | Wood |
| 5,871,555 A | 2/1999 | Wood |
| 5,876,470 A | 3/1999 | Abrahamson |
| 5,893,935 A | 4/1999 | Wood |
| 5,908,478 A | 6/1999 | Wood |
| 5,984,988 A | 11/1999 | Berg et al. |
| 6,039,775 A | 3/2000 | Ho et al. |
| 6,053,956 A | 4/2000 | Wood |
| 6,074,278 A | 6/2000 | Wu et al. |
| 6,080,216 A | 6/2000 | Erickson |
| 6,206,942 B1 | 3/2001 | Wood |
| 6,228,134 B1 | 5/2001 | Erickson |
| 6,264,710 B1 | 7/2001 | Erickson |
| 6,270,395 B1 | 8/2001 | Towery et al. |
| 6,277,161 B1 | 8/2001 | Castro et al. |
| 6,287,353 B1 | 9/2001 | Celikkaya |
| 6,399,689 B1 | 6/2002 | Scarlette |

* cited by examiner

*Primary Examiner*—Michael Marcheschi

(57) ABSTRACT

Sintered alpha alumina-based abrasive particles comprising alpha alumina, $Gd_2O_3$, and ZnO, and methods of making the same. The abrasive particles can be incorporated, for example, into a variety of abrasive articles, including bonded abrasives, coated abrasives, nonwoven abrasives, and abrasive brushes.

36 Claims, 4 Drawing Sheets

ABRASIVE PARTICLES, ABRASIVE ARTICLES, AND METHODS OF MAKING AND USING THE SAME

FIELD OF THE INVENTION

This invention relates to abrasive particles and methods of making the same. The abrasive particles can be incorporated into a variety of abrasive articles, including bonded abrasives, coated abrasives, nonwoven abrasives, and abrasive brushes.

BACKGROUND

In the early 1980's a new and substantially improved type of alumina abrasive particles, commonly referred to as "sol gel" or "sol gel-derived" abrasive particles, was commercialized. This new type of alpha alumina abrasive particle had a microstructure made up of very fine alpha alumina crystallites. The grinding performance of the new abrasive particle on metal, as measured, for example, by life of abrasive products made with the particles was dramatically longer than such products made from conventional, fused alumina abrasive particles.

In general, sol gel abrasive particles are typically made by preparing a dispersion or sol comprising water, alumina monohydrate (boehmite), and optionally peptizing agent (e.g., an acid such as nitric acid), gelling the dispersion, drying the gelled dispersion, crushing the dried dispersion into particles, calcining the particles to remove volatiles, and sintering the calcined particles at a temperature below the melting point of alumina Frequently, the dispersion also includes one or more oxide modifiers (e.g., $CeO_2$, $Cr_2O_3$, CoO, $Dy_2O_3$, $Er_2O_3$, $Eu_2O_3$, $Fe_2O_3$, $Gd_2O_3$, $HfO_2$, $La_2O_3$, $Li_2O$, MgO, MnO, $Na_2O$, $Nd_2O_3$, NiO, $Pr_2O_3$, $Sm_2O_3$, $SiO_2$, $SnO_2$, $TiO_2$, $Y_2O_3$, $Yb_2O_3$, ZnO, and $ZrO_2$), nucleating agents (e.g., $\alpha$-$Al_2O_3$, $\alpha$-$Cr_2O_3$, and $\alpha$-$Fe_2O_3$) and/or precursors thereof. Such additions are typically made to alter or otherwise modify the physical properties and/or microstructure of the sintered abrasive particles. In addition, or alternatively, such oxide modifiers, nucleating agents, and/or precursors thereof may be impregnated into the dried or calcined material (typically calcined particles).

Certain preferred alpha alumina-based abrasive particles are highly dense (i.e., greater than 95% of theoretical) and have a fine (e.g., submicrometer), uniform alpha alumina microstructure. Further, some preferred alpha alumina-based abrasive particles include oxide modifiers, as discussed above, which may, in some cases also include submicrometer oxides other than alpha alumina, wherein the latter may or may not be submicrometer. The grain size of the alpha alumina and other oxides, the oxide phases present in the abrasive particles, as well as the physical properties (e.g., density, hardness, and toughness) or characteristics may depend, for example, on the particular composition and/or process (including sintering time and temperature) used to make the abrasive particles. For example, longer sintering times and higher temperatures tend to provide higher density abrasive particles. However, longer sintering times and higher temperatures also tend to undesirably increase grain growth.

Sol-gel-derived alpha alumina-based sintered abrasive particles have been used in a wide variety of abrasive products (e.g., bonded abrasives, coated abrasives, and abrasive brushes) and abrading applications, including both low and high pressure grinding applications.

Even though there are a variety of abrasive particles known, including a number of sol-gel-derived abrasive particles, the abrasive industry continues to desire additional abrasive particles which may offer a performance advantage(s) in one or more applications.

SUMMARY OF THE INVENTION

In one aspect, the present invention provides a sintered alpha alumina-based abrasive particle comprising alpha alumina (in some embodiments, 55 to 97, or even 55 to 93 percent by weight), and, by weight, $Gd_2O_3$ in a range from 1 to 15 percent (in some embodiments, 2 to 8 percent), and ZnO in a range from 0.2 to 8 percent (in some embodiments, 1 to 5 percent), based on the total metal oxide content of the abrasive particle, and a $Gd_2O_3$ to ZnO molar ratio in a range from 2:1 to 1:5 (in some embodiments, in a range from 1:2 to 1:4, or even 1:2 to 1:3), wherein less than 0.05 (in some embodiments, less than 0.025, or even less than 0.01) volume percent of the alpha alumina present in the sintered alpha alumina-based abrasive particle was nucleated with a nucleating agent (i.e., material having the same or approximately the same crystalline structure as alpha alumina, or otherwise behaving as alpha alumina) itself (e.g., alpha alumina seeds, alpha $Fe_2O_3$ seeds, or alpha $Cr_2O_3$ seeds) or a precursor thereof; other nucleating agents may include $Ti_2O_3$ (having a trigonal crystal structure), $MnO_2$ (having a rhombic crystal structure), $Li_2O$ (having a cubic crystal structure), and titanates (e.g., magnesium titanate and nickel titanate).

In another aspect, the present invention provides a method for making sintered alpha alumina-based abrasive particles according to the present invention, the method comprising:

preparing a dispersion by combining components comprising liquid medium, peptizing agent, boehmite, a $Gd_2O_3$ source (e.g., a gadolinium salt), and a ZnO source (e.g., a zinc salt);

converting the dispersion to particulate alpha alumina-based abrasive particle precursor material; and sintering the particulate alpha alumina-based abrasive particle precursor material to provide the sintered alpha alumina-based abrasive particles.

In another aspect, the present invention provides a method for making sintered alpha alumina-based abrasive particles according to the present invention, the method comprising:

preparing a dispersion by combining components comprising liquid medium, peptizing agent and boehmite;

converting the dispersion to particulate alpha alumina-based abrasive particle precursor material;

calcining the particulate alpha alumina-based abrasive particle precursor material to provide first calcined alpha alumina-based abrasive particle precursor particles;

impregnating the first calcined particles with an impregnation composition comprising liquid medium to provide impregnated alpha alumina-based abrasive particle precursor particles;

calcining the impregnated alpha alumina-based abrasive particle precursor particles to provide second calcined alpha alumina-based abrasive particle precursor particles; and sintering the second calcined particles to provide the sintered alpha alumina-based abrasive particles, wherein at least one of the dispersion or the impregnation composition comprise a $Gd_2O_3$ source (e.g., gadolinium salt) and a ZnO source (e.g., a zinc salt).

In this application:

"Boehmite" refers to alpha alumina monohydrate and boehmite commonly referred to in the art as "pseudo" boehmite (i.e., $Al_2O_3 \cdot xH_2O$, wherein x=1 to 2).

"Alpha alumina-based abrasive particle precursor," "Abrasive particle precursor" or "unsintered abrasive particle" refers to a dried alumina-based dispersion (i.e., "dried abrasive particle precursor") or a calcined alumina-based dispersion (i.e., "calcined abrasive particle precursor"), typically in the form of particles, that has a density of less than 80% (typically less than 60%) of theoretical, and is capable of being sintered or impregnated with an impregnation composition and then sintered to provide sintered alpha alumina-based abrasive particle.

"Sintered alpha alumina-based abrasive particle" as used herein refers to an alpha abrasive particle that has been sintered to a density of at least 85% (preferably, at least 90% and more preferably, at least 95%) of theoretical, and contains, on a theoretical oxide basis, at least 60) by weight $Al_2O_3$.

"Dispersion" or "sol" refers to a solid-in-liquid two-phase system wherein one phase comprises finely divided particles (in the colloidal size range) distributed throughout a liquid. A "stable dispersion" or "stable sol" refer to a dispersion or sol from which the solids do not appear by visual inspection to begin to gel, separate, or settle upon standing undisturbed for about 2 hours.

"Impregnation composition" refers to a solution or dispersion of a liquid medium, and a typically a source of metal oxide that can be impregnated into an abrasive particle precursor.

"Impregnated abrasive particle precursor" refers to a dried alumina-based dispersion (i.e., "impregnated dried abrasive particle precursor") or a calcined alumina-based dispersion (i.e., "impregnated calcined abrasive particle precursor") that has a density of less than 80% (typically less than 60%) of theoretical, and has been impregnated with an impregnation composition, and includes impregnated dried particles and impregnated calcined particles.

"Sintering" refers to a process of heating at a temperature below the melting temperature of the material being heated to provide densification and crystallite growth to provide a tough, hard, and chemically resistant ceramic material. The sintered alpha alumina-based abrasive particle according to the present invention is not made by a fusion process wherein heating is carried out at a temperature above the melting temperature of the material being heated.

Abrasive particles according to the present invention are useful, for example, in loose form or used incorporated into abrasive articles. Abrasive articles according to the present invention comprise binder and a plurality of abrasive particles, wherein at least a portion of the abrasive particles are the abrasive particles according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments preferably, at least 5, 10, 15, 20, 25, 30, 35, 40, 45, 50 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

Abrasive particles are usually graded to a given particle size distribution before use. Such distributions typically have a range of particle sizes, from coarse particles fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments preferably, at least 5, 10, 15, 20, 25, 30, 35, 40, 45, 50 55, 60, 65, 70, 75, 80, 85, 90, 95, or even 100 percent by weight of the plurality of abrasive particles are the abrasive particles according to the present invention, based on the total weight of the plurality of abrasive particles.

In another aspect, the present invention provides a method of abrading a surface, the method comprising:

providing an abrasive article comprising a binder and a plurality of abrasive particles, wherein at least a portion of the abrasive particles according to the present invention;

contacting at least one of the abrasive particles according to the present invention with a surface of a workpiece; and moving at least one of the contacted abrasive particles according to the present invention or the contacted surface to abrade at least a portion of the surface with the contacted abrasive particle according to the present invention.

BRIEF DESCRIPTION OF THE DRAWING

FIGS. 4 and 6 are elevational plan views of an extruder useful in the methods according to the present invention, while

DETAILED DESCRIPTION

Figure 1:
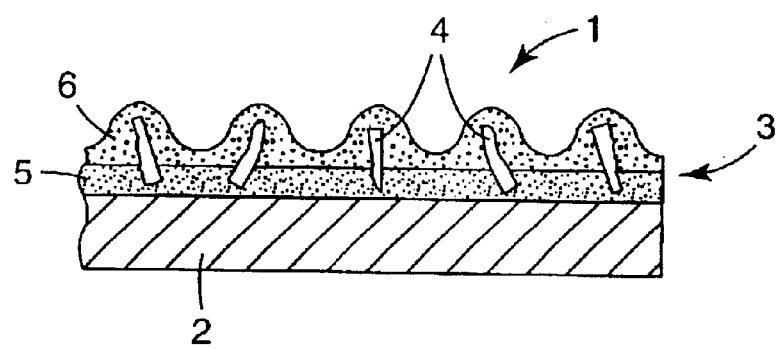
FIG. 1 is a fragmentary cross-sectional schematic view of a coated abrasive article including abrasive particles according to the present invention.

Suitable alumina sources for making the dispersion include boehmites commercially available under the trade designations "DISPERAL" from Condea GmbH, Hamburg, Germany; "DISPAL 23N480" and "CATAPAL D" from Condea Vista Company, Houston, Tex.; and "HIQ" (e.g., "HIQ-10," "HIQ-20," "HIQ-30," and "HIQ-40") from Alcoa Industrial Chemicals. These boehmites or alumina monohydrates are in the alpha form, and include relatively little, if any, hydrated phases other than monohydrates (although very small amounts of trihydrate impurities can be present in some commercial grade boehmite, which can be tolerated). They have a low solubility in water and have a high surface area (typically at least about 180 $m^2/g$). In some of embodiments, the dispersed boehmite desirably has an average crystallite size of less than about 20 nanometers (more desirably, less than 12 nanometers). In this context, "crystallite size" is determined by the 120 and 031 x-ray reflections.

In some of embodiments, the liquid medium is typically water, although organic solvents, such as lower alcohols (typically $C_{1-6}$ alcohols), hexane, or heptane, may also be useful as the liquid medium. The water may be tap water, distilled water or deionized water.

Suitable peptizing agents are generally soluble ionic compounds which are believed to cause the surface of a particle or colloid to be uniformly charged in a liquid medium (e.g., water). In some of embodiments, the peptizing agents are acids or acid compounds. Examples of typical acids include monoprotic acids and acid compounds, such as acetic, hydrochloric, formic, and nitric acid, with nitric acid being preferred. The amount of acid used depends, for example, on the dispersibility of the particulate alumina source, the percent solids of the dispersion, the components of the dispersion, the amounts, or relative amounts of the components of the dispersion, the particle sizes of the components of the dispersion, and/or the particle size distribution of the components of the dispersion. The dispersion typically contains at least, 0.1 to 20%, and in some embodiments 1% to 10% by weight acid, or even 3 to 8% by weight acid, based on the weight of boehmite in the dispersion.

In some instances, the acid may be applied to the surface of the boehmite particles prior to being combined with the water. The acid surface treatment may provide improved dispersibility of the boehmite in the water.

Optionally, the dispersion may further comprise additional alumina sources such as alpha alumina powders, gamma alumina powders, aluminum formoacetate, aluminum nitroformoacetate, and aluminum salts. Examples of suitable aluminum compounds which can be used as additional alumina precursors include basic aluminum carboxylates, basic aluminum nitrates, partially hydrolyzed aluminum alkoxides or other aluminum salts and complexes. In some of embodiments, basic aluminum salts include those with carboxylate or nitrate counterions or mixtures of these salts. In the case of the basic aluminum carboxylates, these are of the general formula $Al(OH)_y(carboxylate)_{3-y}$, where y is between 1 and 2, in some embodiments between 1 and 1.5, and the carboxylate counterion is selected from the group consisting of formate, acetate, propionate, and oxalate or combinations of these carboxylates. These materials can be prepared, for example, by digesting aluminum metal in a solution of the carboxylic acid as described in U.S. Pat. No. 3,957,598 (Merkl), the disclosure of which is incorporated herein by reference. The basic aluminum nitrates can also be prepared, for example, by digesting aluminum metal in a nitric acid solution as described in U.S. Pat. No. 3,340,205 (Hayes et al.) or British patent 1,193,258, published Jun. 9, 1966 or by the thermal decomposition of aluminum nitrate as described in U.S. Pat. No. 2,127,504 (Derr et al.), the disclosures of which are incorporated herein by reference. These materials can also be prepared, for example, by partially neutralizing an aluminum salt with a base. The basic aluminum nitrates have the general formula $Al(OH)_z(NO_3)_{3-z}$, where z is between about 0.5 to 2.5.

Sources of $Gd_2O_3$ and ZnO include precursors such as metal salts (e.g., metal nitrate salts and metal acetate salts). Metal nitrate and acetate salts can be made by techniques known in the art, or obtained from commercial sources such as Alfa Chemicals of Ward Hill, Mass. and Mallinckrodt Chemicals of Paris, Ky. Examples of nitrate salts include gadolinium nitrate ($Gd(NO_3)_3.5H_2O$) and zinc nitrate ($Zn(ON_3)_3.6H_2O$). Examples of metal acetate salts include gadolinium acetate.

The amount of the $Al_2O_3$ source, $Gd_2O_3$ source, ZnO source in the initial dispersion, and/or provided by the optional impregnation composition, is selected to provide the desired weight percentages in the sintered abrasive particle, although for methods utilizing impregnation, such sources may also, or alternatively be present in an impregnation composition.

The initial dispersion and/or impregnation composition, if used, may further comprise other metal oxide sources (i.e., materials that are capable of being converting into metal oxide with the appropriate heating conditions), sometimes referred to as a metal oxide modifiers. Such metal oxide modifiers may alter the physical properties and/or chemical properties of the resulting abrasive particle. The amount of these other metal oxides incorporated into the initial mixture and/or impregnation composition may depend, for example, on the desired composition and/or properties of the sintered abrasive particle, as well as on the effect or role the additive may have on or play in the process used to make the abrasive particle.

The other metal oxides may be added to the initial dispersion as a metal oxide (e.g., a colloidal suspension or a sol) and/or as a precursor (e.g., a metal salt such as metal nitrate salts, metal acetate salts, metal citrate salts, metal formate salts, and metal chloride salts). For metal oxide particles, the metal oxide particles are generally less than 5 micrometers, or even less than 1 micrometer in size. The colloidal metal oxides are discrete finely divided particles of amorphous or crystalline metal oxide typically having one or more of their dimensions within a range of about 3 nanometers to about 1 micrometer. The "colloidal metal oxide sols" are typically stable (i.e., the metal oxide solids in the sol or dispersion do not appear by visual inspection to begin to gel, separate, or settle upon standing undisturbed for about 2 hours) suspension of colloidal particles (in some embodiments in a liquid medium having a pH of less than 6.5).

Examples of such other metal oxides include: chromium oxide, cobalt oxide, ferric oxide, hafnium oxide, lithium oxide, magnesium oxide, manganese oxide, nickel oxide, titanium oxide, yttrium oxide, zirconium oxide, dysprosium oxide, erbium oxide, praseodymium oxide, neodymium oxide, samarium oxide, ytterbium oxide, yttrium oxide, lanthanum oxide, sodium oxide, europium oxide, and/or silica.

Metal oxide precursors include metal salts (e.g., metal nitrate salts, metal acetate salts, metal citrate salts, metal formate salts, and metal chloride salts). Metal nitrate, acetate, citrate, formate, and chloride salts can be made by techniques known in the art, or obtained from commercial sources such as Alfa Chemicals of Ward Hill, Mass. and Mallinckrodt Chemicals of Paris, Ky. Examples of nitrate salts include cobalt nitrate ($Co(NO_3)_2.6H_2O$), nickel nitrate ($Ni(NO_3)_2.6H_2O$), lithium nitrate ($LiNO_3$), magnesium nitrate ($Mg(NO_3)_2.6H_2O$), manganese nitrate ($Mn(NO_3)_2.4H_2O$), chromium nitrate ($Cr(NO_3)_3.9H_2O$), dysprosium nitrate ($Dy(NO_3)_3.5H_2O$), erbium nitrate ($Er(NO_3)_3.5H_2O$), ($Sm(NO_3)_3.6H_2O$), ytterbium nitrate ($Yb(NO_3)_3.6H_2O$), yttrium nitrate ($Y(NO_3)_3 \cdot 6H_2O$), praseodymium nitrate ($Pr(NO_3)_3 \cdot 6H_2O$), neodymium nitrate ($Nd(NO_3)_3 \cdot 6H_2O$), lanthanum nitrate ($La(NO_3)_3 \cdot 6H_2O$), europium nitrate ($Eu(NO_3)_3 \cdot 6H_2O$), and ferric nitrate ($Fe(NO_3)_3 \cdot 9H_2O$). Examples of metal acetate salts include cobalt acetate, nickel acetate, lithium acetate, magnesium acetate, manganese acetate, chromium acetate, dysprosium acetate, lanthanum acetate, neodymium acetate, praseodymium acetate, samarium acetate, ytterbium acetate, yttrium acetate, ytterbium acetate. Examples of citrate salts include cobalt citrate, lithium citrate, magnesium citrate, and manganese citrate. Examples of formate salts include cobalt formate, lithium formate, magnesium formate, manganese formate, and nickel formate.

An exemplary source of silica that can be added to the initial dispersion is a colloidal sol. The colloidal silica can comprise finely divided particles of amorphous or crystalline silica typically having one or more of their dimensions within a range of about 3 nanometers to about 1 micrometer. The average silica particle size in the colloidal is typically less than about 150 nanometers, less than about 100 nanometers, or even less than about 50 nanometers. In most instances, the silica particles can be on the order of about 3–15 nanometers. In most instances, the colloidal silica comprises a distribution or range of metal oxide particle sizes. Silica sols are available, for example, from Nalco of Naperville, Ill.; and Eka Nobel of Augusta, Ga. Silica sols include those available under the trade designations "NALCO 1115," "NALCO 1130," "NALCO 2326," NALCO 1034A," and "NALCOAG 1056" from Nalco Products, Inc. of Naperville, Ill., wherein the latter two are examples of acidic silica sols; and "NYACOL 215" from Eka Nobel, Inc. For additional information on silica sols see, for example, U.S. Pat. Nos. 5,611,829 (Monroe et al.) and 5,645,619 (Erickson et al.), the disclosures of which are incorporated herein by reference.

Exemplary zirconia sources include zirconium salts and zirconia sols, although the zirconia source in an impregnation composition is typically a zirconium salt that forms a solution in the liquid medium. Examples of zirconium salts include zirconyl acetate ($ZrO(CH_3COO)_2$), zirconium oxynitrate ($ZrO(NO_3)_2 \cdot xH_2O$), wherein x is 2 to 6 (in some embodiments, 5 to 6), zirconium hydroxynitrate, zirconium formate, and zirconium acetylacetonate, zirconium alkoxides (butoxide, ethoxide, propoxide, tert-butoxide), zirconium chloride, zirconium nitrate, ammonium complex, zirconium tetrachloride, zirconium oxychloride octahydrate. The zirconia sol comprises finely divided particles of amorphous or crystalline zirconia typically having one or more of their dimensions within a range of about 3 nanometers to about 250 nanometers. The average zirconia particle size in the colloidal zirconia is typically less than about 150 nanometers, less than about 100 nanometers, or even less than about 50 nanometers. In some instances, the zirconia particles can be on the order of about 3–10 nanometers. In most instances, the colloidal zirconia comprises a distribution or range of zirconia particle sizes. Zirconia sols include those available from Nyacol Products, Inc., Ashland, Mass. under the trade designations "ZR10/2020" and "ZR100/20". For more information on zirconia sols, see, for example, U.S. Pat. No. 5,498,269 (Larmie) and U.S. Pat. No. 5,551,963 (Larmie), the disclosures of which are incorporated herein by reference.

Certain metal oxides may react with the alumina to form a reaction product and/or form crystalline phases with the alpha alumina which may be beneficial during use of the abrasive particle in abrading applications. Thus the selection and amount of metal oxide will depend in part upon the processing conditions and the desired abrading properties of the abrasive particle.

The oxides of cobalt, nickel, zinc, and magnesium, for example, typically react with alumina to form a spinel, whereas zirconia and hafnia typically do not react with the alumina. Alternatively, for example, the reaction products of dysprosium oxide and gadolinium oxide with aluminum oxide are generally garnet. The reaction products of praseodymium oxide, ytterbium oxide, erbium oxide, and samarium oxide with aluminum oxide generally have a perovskite and/or garnet structure. Yttria can also react with the alumina to form $Y_3Al_5O_{12}$ having a garnet crystal structure.

Certain rare earth oxides and divalent metal cations react with alumina to form a rare earth aluminate represented by the formula $LnMAl_{11}O_{19}$, wherein Ln is a trivalent metal ion such as $La^{3+}$, $Nd^{3+}$, $Ce^{3+}$, $Pr^{3+}$, $Sm^{3+}$, $Gd^{3+}$, $Er^{3+}$, or $Eu^{3+}$, and M is a divalent metal cation such as $Mg^{2+}$, $Mn^{2+}$, $Ni^{2+}$, $Zn^{2+}$, or $Co^{2+}$. Such aluminates, which are typically in the form of platelets, have a hexagonal crystal structure, are also referred to as magnetoplumbites.

For additional details regarding the inclusion of metal oxide (and/or precursors thereof) in a boehmite dispersion see, for example, in U.S. Pat. No. 4,314,827 (Leitheiser et al.), U.S. Pat. No. 4,770,671 (Monroe et al.), U.S. Pat. No. 4,881,951 (Wood et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference.

Alumina-based dispersions (e.g., boehmite-based dispersions) utilized in the practice of the present invention typically comprise greater than 15% by weight (generally from greater than 20% to about 80% by weight; typically greater than 30% to about 80% by weight) solids (or alternatively boehmite), based on the total weight of the dispersion. In some embodiments dispersions, however, comprise 35% by weight or more, 45% by weight or more, 50% by weight or more, 55% by weight or more, 60% by weight or more and 65% by weight or more by weight or more solids (or alternatively boehmite), based on the total weight of the dispersion. Weight percents of solids and boehmite above about 80 wt-% may also be useful, but tend to be more difficult to process to make the abrasive particle provided by the method according to the present invention.

General procedures for making sintered alpha alumina-based abrasive particle are disclosed for example, in U.S. Pat. No. 4,518,397 (Leitheiser et al.), U.S. Pat. No. 4,770,671 (Monroe), U.S. Pat. No. 4,744,802 (Schwabel), U.S. Pat. No. 5,139,978 (Wood), U.S. Pat. No. 5,219,006 (Wood), and U.S. Pat. No. 5,593,647 (Monroe), the disclosures of which are incorporated herein by reference.

The (initial) dispersion is typically prepared by adding the various components and then mixing them together to provide a homogenous mixture. For example, boehmite is typically added to water that has been mixed with nitric acid. The other components are added before, during, or after the boehmite is added.

A high solids dispersion is typically prepared by gradually adding a liquid component(s) to a component(s) that is non-soluble in the liquid component(s), while the latter is mixing or tumbling. For example, a liquid containing water, nitric acid, and metal salt may be gradually added to boehmite, while the latter is being mixed such that the liquid is more easily distributed throughout the boehmite.

Suitable mixers include pail mixers, sigma blade mixers, ball mill and high shear mixers. Other suitable mixers may be available from Eirich Machines, Inc. of Gurnee, Ill.; Hosokawa-Bepex Corp. of Minneapolis, Minn. (including a mixer available under the trade designation "SCHUGI FLEX-O-MIX", Model FX-160); and Lttleford-Day, Inc. of Florence, Ky.

Boehmite-based dispersions may be heated to increase the dispersibility of the alpha alumina monohydrate, other particulate material, and/or to create a homogeneous dispersion. The temperature may vary to convenience, for example the temperature may range from about 20° C. to 80° C., usually between 25° C. to 75° C. In addition or alternatively, for example, the dispersion may be heated under a pressure ranging from 1.5 to 130 atmospheres of pressure.

Boehmite-based dispersions typically gel prior to, or during, drying. The addition of most modifiers may result in the dispersion gelling faster. Alternatively, ammonium acetate or other ionic species may be added to induce gelation of the dispersion. The pH of the dispersion and concentration of ions in the gel generally determines how fast the dispersion gels. Typically, the pH of the dispersion is within a range of about 1.5 to about 5.

The dispersion may be extruded. It may be preferable to extrude (typically a dispersion where at least 50 percent by weight of the alumina content is provided by particulate (e.g., boehmite), including in this context a gelled dispersion, or even partially deliquified dispersion. The extruded dispersion, referred to as extrudate, can be extruded into elongated precursor material (e.g., rods (including cylindrical rods and elliptical rods)). After firing, the rods may have an aspect ratio between 1.5 to 10, in some embodiments between 2 to 6. Alternatively the extrudate may be in the form of a very thin sheet, see for example U.S. Pat. No. 4,848,041 (Kruschke) herein after incorporated in by reference. Examples of suitable extruders include ram extruders, single screw, twin screw, and segmented screw extruders. Suitable extruders are available, for example, from Loomis Products of Levitown, Pa., Bonnot Co. of Uniontown, Ohio, and Hosokawa-Bepex of Minneapolis, Minn., which offers, for example, an extruder under the trade designation "EXTRUD-O-MIX" (Model EM-6).

The dispersion can be compacted, for example, prior to or during extrusion (wherein the extrusion step may inherently involve compaction of the dispersion). In compacting the dispersion, it is understood that the dispersion is subjected to a pressure or force such as experienced, for example, in a pellitizer or die press (including mechanical, hydraulic and pneumatic or presses) or an extruder (i.e., all or substantially all of the dispersion experiences the specified pressure). In general, compacting the dispersion reduces the amount of air or gases entrapped in the dispersion, which in turn generally produces a less porous microstructure, that is more desirable. Additionally the compaction step results an easier way to continuously feed the extruder and thus may save on labor producing the abrasive particle.

If the elongated precursor material is a rod, it may have a diameter such that the sintered abrasive particle will have a diameter of, for example, about 150–5000 micrometers, and in some embodiments, an aspect ratio (i.e., length to width ratio) of at least 2.5:1, at least 4:1, or even at least 5:1. The rod may have any cross sectional shape including a circle, an oval, a star shape, a tube and the like. The rod abrasive particle may also be curved.

Figure 4:
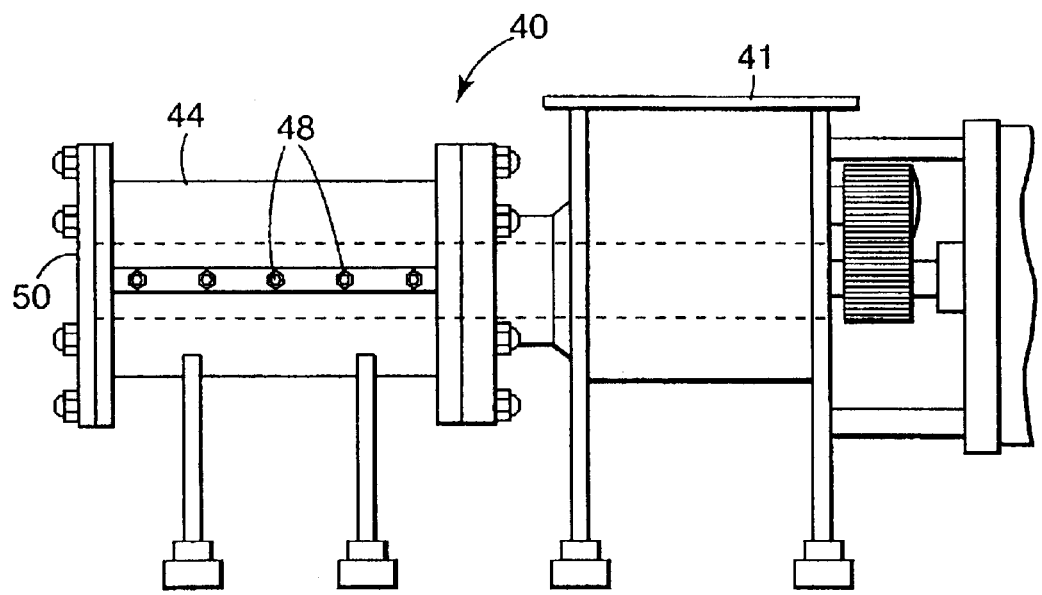
Figure 5:
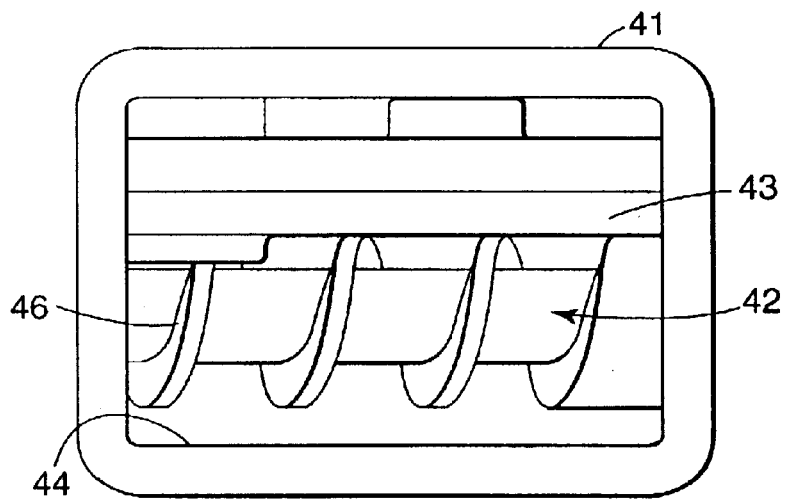
FIG. 5 is an enlarged top plan of the extruder feed port.
Figure 6:
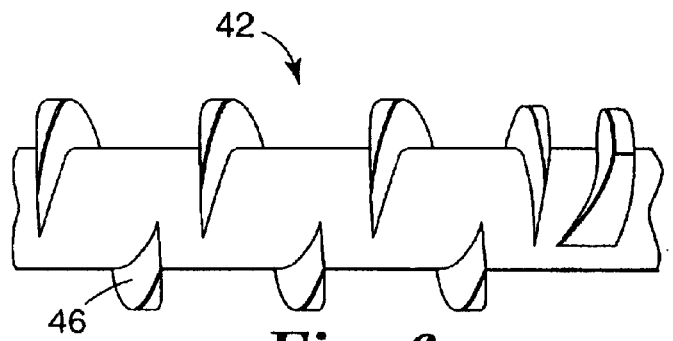

An exemplary apparatus for compacting the dispersion (gelled or not) is illustrated in FIGS. 4–6. Modified segmented screw extruder 40, has feed port 41 and auger 42 centrally placed within barrel 44. FIG. 5 is a view of the interior of extruder 40 looking through feed port 41. Barrel 44 has grooves (not shown; generally known as "lands") running parallel down its length. Pins 48 extend centrally into barrel 44. Further, helical flight 46 extends the length of auger 42. Flight 46 is not continuous down the length of auger 42 but is segmented so that flight 46 on auger 42 does not come into contact with pins 48.

The dispersion (including in this context gelled dispersion) (not shown) is fed in feed port 41. Packer screw 43 urges the dispersion against auger 42 so that the dispersion is compacted by auger 42 and extruded through die 49. Die 49 can have a variety of apertures or holes therein (including a single hole or multiple holes). The die apertures can be any of a variety of cross sectional shapes, including a circle or polygon shapes (e.g., a square, star, diamond, trapezoid, or triangle). The die apertures can be any of a variety of sizes, but typically range from about 0.5 mm (0.02 inch) to 1.27 cm (0.5 inch), and more typically, from about 0.1 cm (0.04 inch) to about 0.8 cm (0.3 inch).

The extruded dispersion can be can be cut or sliced, for example, to provide discrete particles, and/or to provide particles having a more uniform length. Examples of methods for cutting (or slicing) the dispersion include rotary knife, blade cutters and wire cutters. The compacted dispersion can also be shredded and/or grated.

In general, techniques for drying the dispersion are known in the art, including heating to promote evaporation of the liquid medium, or simply drying in air. The drying step generally removes a significant portion of the liquid medium from the dispersion; however, there still may be a minor portion (e.g., about 10% or less by weight) of the liquid medium present in the dried dispersion. Typical drying conditions include temperatures ranging from about room temperature to over about 200° C., typically between 50° C. to 150° C. The times may range from about 30 minutes to over days. To minimize salt migration, it may be desirable to dry the dispersion at low temperature.

After drying, the dried mixture (e.g., dispersion) may be converted into precursor particles. One typical means to generate these precursor particles is by a crushing technique. Various crushing or comminuting techniques may be employed such as a roll crusher, jaw crusher, hammer mill, ball mill and the like. Coarser particles may be recrushed to generate finer particles. In some embodiments, the dried dispersion is crushed, as, for example, it is generally easier to crush dried gel versus the sintered alpha alumina based abrasive particle.

Alternatively, for example, the mixture may be converted into precursor particles prior to drying. This may occur for instance if the mixture is processed into a desired particle shape and particle size distribution. For example, the dispersion may be extruded into rods that are subsequently cut to the desired lengths and then dried. Alternatively, for example, the mixture may be molded into a triangular shape particle and then dried. Additional details concerning triangular shaped particles may be found in U.S. Pat. No. 5,201,916 (Berg et al.), the disclosure of which is incorporated herein by reference.

Alternatively, for example, the dried mixture (e.g., dispersion) is shaped into lumps with a high volatilizable content which then are explosively comminuted by feeding the lumps directly into a furnace held at a temperature above 350° C., usually a temperature between 600° C. to 900° C.

Typically, the dried mixture is calcined, prior to sintering, although a calcining step is not always required. In general, techniques for calcining the dried mixture or ceramic precursor material, wherein essentially all the volatiles are removed, and the various components that were present in the dispersion are transformed into oxides, are known in the art. Such techniques include using a rotary or static furnace to heat dried mixture at temperatures ranging from about 400–1000° C. (typically from about 450–800° C.) until the free water, and typically until at least about 90 wt-% of any bound volatiles are removed.

It is also within the scope of the present invention, and a part of at least one method according to the present invention, to impregnate a metal oxide modifier source (typically a metal oxide precursor) into a calcined precursor particle. For example, in at least one method according to the present invention, at least a portion of the zinc oxide source (e.g., a zinc salt) and/or at least a portion of the $Gd_2O_3$ source (e.g., a gadolinium salt) can be impregnated into precursor material. Typically, the metal oxide precursors are in the form metal salts. These metal oxide precursors and metal salts are described above with respect to the initial mixture.

Methods of impregnating sol gel-derived particles are described in general, for example, in U.S. Pat. No. 5,164,348 (Wood), the disclosure of which is incorporated herein by reference. In general, ceramic precursor material (i.e., dried alumina-based mixture (or dried ceramic precursor material), or calcined alumina-based mixture (or calcined ceramic precursor material)) is porous. For example, a calcined ceramic precursor material typically has pores about 2–15 nanometers in diameter extending therein from an outer surface. The presence of such pores allows an impregnation composition comprising a mixture comprising liquid medium (typically water) and appropriate metal precursor to enter into ceramic precursor material. The metal salt material is dissolved in a liquid, and the resulting solution mixed with the porous ceramic precursor particle material. The impregnation process is thought to occur through capillary action.

The liquid used for the impregnating composition can be, for example, water (including deionized water), an organic solvent, and mixtures thereof If impregnation of a metal salt is desired, the concentration of the metal salt in the liquid medium is typically in the range from about 5% to about 40% dissolved solids, on a theoretical metal oxide basis. In some embodiments, there is at least 50 ml of solution added to achieve impregnation of 100 grams of porous precursor particulate material, and, for example, in some embodiments, at least about 60 ml of solution to 100 grams of precursor particulate material.

After the impregnation, the resulting impregnated precursor particle is typically calcined to remove any volatiles prior to sintering. The conditions for this calcining step are described above.

After the precursor particle is formed or optionally calcined, the precursor particle is sintered to provide a dense, ceramic alpha alumina based abrasive particle. In general, techniques for sintering the precursor material, which include heating at a temperature effective to transform transitional alumina(s) into alpha alumina, to causing all of the metal oxide precursors to either react with the alumina or form metal oxide, and increasing the density of the ceramic material, are known in the art. The precursor material may be sintered by heating (e.g., using electrical resistance, microwave, plasma, laser, or gas combustion, on batch basis or a continuous basis). Sintering temperatures are usually range from about 1200° C. to about 1650° C.; typically, from about 1200° C. to about 1500° C.; more typically, less than 1400° C. The length of time which the precursor material is exposed to the sintering temperature depends, for example, on particle size, composition of the particles, and sintering temperature. Typically, sintering times range from a few seconds to about 60 minutes (in some embodiments, within about 3–30 minutes). Sintering is typically accomplished in an oxidizing atmosphere, although inert or reducing atmospheres may also be useful.

The longest dimension of the alpha alumina-based abrasive particle is typically at least about 1 micrometer. The abrasive particles described herein can be readily made with a length of greater than about 50 micrometers, and larger abrasive particles (e.g., greater than about 1000 micrometers or even greater than about 5000 micrometers) can also be readily made. In some embodiments, abrasive particles have a length(s) in the range from about 100 to about 5000 micrometers (typically in the range from about 100 to about 3000 micrometers), although other sizes are also useful, and may even be preferred for certain applications. In another aspect, abrasive particles according to the present invention, typically have an aspect ratio of at least 1.2:1 or even 1.5:1, sometimes at least 2:1, and alternatively, at least 2.5:1.

Dried, calcined, and/or sintered materials provided during or by the method according to the present invention, are typically screened and graded using techniques known in the art. For example, the dried particles are typically screened to a desired size prior to calcining. Sintered abrasive particles are typically screened and graded prior to use in an abrasive application or incorporation into an abrasive article.

It is also within the scope of the present invention to recycle unused (typically particles too small in size to provide the desired size of sintered abrasive particles) deliquified mixture (typically dispersion) material as generally described, for example, in U.S. Pat. No. 4,314,827 (Leitheiser et al.), the disclosure of which is incorporated herein by reference. For example, a first dispersion can be made as described above, dried, crushed, and screened, and then a second dispersion made by combining, for example, liquid medium (e.g., aqueous), boehmite, and deliquified material from the first dispersion, and optionally metal oxide and/or metal oxide precursor. The recycled material may provide, on a theoretical metal oxide basis, for example, at least 10 percent, at least 30 percent, at least 50 percent, or even up to (and including) 100 percent of the theoretical $Al_2O_3$ content of the dispersion which is deliquified and converted (including calcining and sintering) to provide the sintered abrasive particles.

In some embodiments of the invention, the abrasive particles are processed such that it is "sharp". The term sharp is known to one skilled in the abrasive particle art. In general, a sharp abrasive particle is elongated in shape (e.g., needle-like). Another way to describe a sharp abrasive particle is a particle that is in the form of sliver or shard. A sharp abrasive particle does not have a blocky shape associated with it. It is typically preferred that the sharp abrasive particle have "pointy" ends (i.e., the faces forming the ends of the abrasive particle meet at a point). Additionally, it is typically preferred that the sharp abrasive particle has angular faces.

There are several techniques to measure the sharpness of an abrasive particle, including bulk density and aspect ratio. The bulk density of the abrasive particles can be measured, for example, in accordance with ANSI Standard B74.4-1992, published November, 1992, the disclosure of which is incorporated herein by reference.

Typically, and desirably, the (true) density of abrasive particles according to the present invention is at least 90 percent (in some embodiments, at least 95 percent, 96 percent, 97 percent, 98 percent, or even at least 99 percent) of theoretical density.

The aspect ratio, which is also an indication of sharpness, is defined as the length of an abrasive particle divided by the cross sectional width. Typically, sharp abrasive particles have an aspect ratio of at least one to one, in some embodiments, at least about 1.5 to 1, at least about 2 to 1, or even greater than 3 to 1.

It is also within the scope of the present invention to coat the abrasive particles with a surface coating such as described in U.S. Pat. No. 1,910,440 (Nicholson), U.S. Pat. No. 3,041,156 (Rowse), U.S. Pat. No. 5,009,675 (Kunz et al.), U.S. Pat. No. 4,997,461 (Markhoff-Matheny et al.), and U.S. Pat. No. 5,042,991 (Kunz et al.), U.S. Pat. No. 5,011,508 (Wald et al.), and U.S. Pat. No. 5,213,591 (Celikkaya et al.), the disclosures of which are incorporated herein by reference.

In some embodiments, sintered alpha alumina-based abrasive particles according to the present invention further comprise a zirconia coating. Although not wanting to be bound by theory, it is believed that such coated abrasive particles are particularly useful in bonded abrasives utilizing a vitrified bond as the coating adds texture to the surface of the abrasive particles thereby increasing mechanical adhesion of the abrasive particles to the vitrified binder. Further, it is believed such coating protects the abrasive particles from reacting with the vitrified binder and weakening the abrasive particle.

Such zirconia coatings can be applied, for example by the impregnation method described above, wherein the zirconia source is, for example zirconium oxynitrate $(ZrO(NO_3)_2 \cdot xH_2O)$, wherein x is 2 to 6 and/or zirconium hydroxynitrate $((ZrO(OH)NO_3)$.

Typically, sintered alpha alumina-based abrasive particle according to the present invention have an average alpha alumina crystallite size in a range from 1 micrometer to 40 micrometers, and in some embodiments, in a range from 1 micrometer to 10 micrometers.

The average crystallite size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) in a cylinder of resin about 2.5 cm in diameter and about 1.9 cm high. The mounted section is polished using conventional polishing techniques with a polisher (such as that obtained from Buehler, Lake Bluff, Ill. under the trade designation "ECOMET 3"). The sample is polished for about 3 minutes with a 70 micrometer diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as the JEOL SEM Model JSM 840A). A typical back-scattered electron (BSE) micrograph of the microstructure found in the sample is used to determine the average crystallite size as follows. The number of crystallites that intersect per unit length $(N_L)$ of a random straight line drawn across the micrograph are counted. The average crystallite size is determined from this number using the following equation.

$$\text{Average Crystallite Size} = \frac{1.5}{N_L M}$$

Where $N_L$ is the number of crystallites intersected per unit length and M is the magnification of the micrograph.

In another aspect, sintered alpha alumina-based abrasive particle according to the present invention have at least a portion of the rare earth oxide is present as magnetoplumbite platelets. In some embodiments, the magnetoplumbite platelets have an average longitudinal size in a range from 0.5 micrometer to 5 micrometers, or even 0.8 micrometer to 2 micrometers, and an average cross-sectional thickness in a range from 0.005 micrometer to 0.2 micrometer, or even 0.15 micrometer to 0.15 micrometer, wherein the longitudinal size of a particle is the longest length of the particle.

The average longitudinal size and average cross-sectional thickness of the magnetoplumbite platelets can be determined from a scanning electron microscope photomicrograph. The sample is prepared as described above for the crystallite size determination. A scanning electron microscope photomicrograph in backscatter is taken at 10,000× to provide a printed image that is about 120 mm long by about 90 mm wide. This image is divided into 12 squares each about 30 mm by about 30 mm. Each square is visually inspected and two representative platelets selected in each square for measurement (i.e., length and thickness). Only those platelets having two discernable ends are used for measurement. If there are more than two such platelets on a square, then the two platelets in that square selected for determining the average size are the two platelets closest in size to the average of the platelets in the square having two discernable ends. Twenty four platelets are measured and averaged to provide the reported average length and thickness values. Further, the platelet sizes reported are for the edge faces only as it is believed that the polished surfaces and random platelet orientation do not give reliable views of the broader platelet faces.

Abrasive particles according to the present invention have an average hardness of at least 15 GPa, in some embodiments, at least 16 GPa, or even at least 17 GPa.

The average hardness of the material of the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a 70 micrometer diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 500-gram indent load. The microhardness measurements are made according to the guidelines stated in ASTM Test Method E384 Test Methods for Microhardness of Materials (1991), the disclosure of which is incorporated herein by reference.

Abrasive particles according to the present invention can be screened and graded using techniques well known in the art, including the use of industry recognized grading standards such as ANSI (American National Standard Institute), FEPA. (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

ANSI grade designations include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000.

In another aspect, the present invention provides agglomerate abrasive particles each comprise a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An example of a coated abrasive article according to the present invention is depicted in FIG. 1. Referring to this figure, coated abrasive article according to the present invention 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
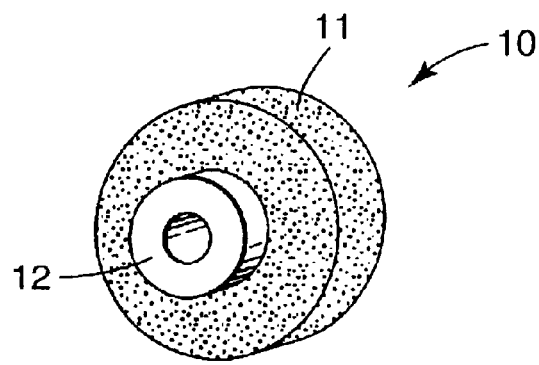
FIG. 2 is a perspective view of a bonded abrasive article including abrasive particles according to the present invention.

An exemplary form is a grinding wheel. Referring to FIG. 2, grinding wheel according to the present invention 10 is depicted, which includes abrasive particles according to the present invention 11, molded in a wheel and mounted on hub 12.

Figure 3:
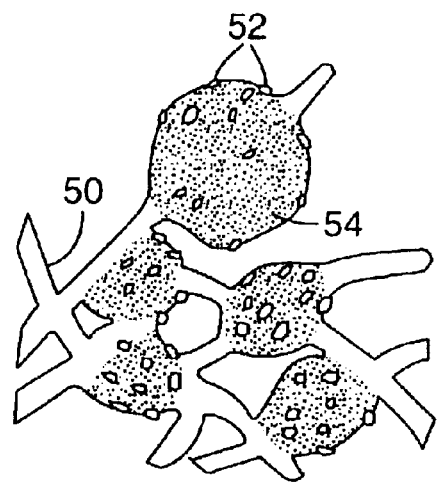
FIG. 3 is an enlarged schematic view of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. In FIG. 3, a schematic depiction, enlarged about 100×, of a typical nonwoven abrasive article according to the present invention is provided. Such a nonwoven abrasive article according to the present invention comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, litanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. An exemplary vitrified bonded abrasive article according to the present invention is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials may include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. The preferred grinding aid is cryolite; the most preferred grinding aid is potassium tetrafluoroborate.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 $g/m^2$ (desirably, about 80–160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles according to the present invention. In some instances, the abrasive particles according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.) U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et. al), U.S. Pat. No. 5,143,522 (Gibson et al.), and U.S. Pat. No. 5,336,280 (Dubots et. al), and applications having U.S. Ser. Nos.

09/495,978, 09/496,422, 09/496,638, and 09/496,713, each filed on Feb. 2, 2000, and, 09/618,876, 09/618,879, 09/619,106, 09/619,191, 09/619,192, 09/619,215, 09/619,289, 09/619,563, 09/619,729, 09/619,744, and 09/620,262, each filed on Jul. 19, 2000, and 09/772,730, filed Jan. 30, 2001, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444 and 09/688,484, filed Oct. 16, 2000, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieperet al.), U.S. Pat. No. 5,378,251 (Culleret al.), U.S. Pat. No. 5,417,726 (Stout et al.), U.S. Pat. No. 5,436,063 (Follettet al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et al.), U.S. Pat. No. 4,997,461 (Markhoff-Matheny et al.), U.S. Pat. No. 5,094,672 (Giles Jr. et al.), U.S. Pat. Nos. 5,118,326 (Sheldon et al.), 5,131,926(Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle according to the present invention, with a surface of a workpiece; and moving at least of one the abrasive particle or the contacted surface to abrade at least a portion of the surface with the abrasive particle. Methods for abrading with abrasive particles according to the present invention range of snagging (i.e., high pressure high stock removal) to polishing (e.g., polishing medical implants with coated abrasive belts), wherein the latter is typically done with finer grades (e.g., less ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Oxides in abrasive particles are on a theoretical elemental oxide basis without regard to phases present. The experimental error in the tests was about ±5%.

Any reference to the percent solids levels of the dispersion used in the following examples are the approximate solids levels, as they do not take into account the 2–6% water commonly found on the surface of boehmite, nor the solids provided by any non-boehmite additives.

EXAMPLES

A summary of various raw materials used to prepare the examples is provided in Table 1, below.

TABLE 1

| Raw materials | Wt. - % as oxide in solution | |
|---|---|---|
| yttrium nitrate, aqueous solution $Y(NO_3)_3 \cdot 6H_2O$ | 23.8% $Y_2O_3$ | Molycorp Inc., Mountain Pass, CA |
| praseodymium nitrate, aqueous solution $Pr(NO_3)_3 \cdot 6H_2O$ | 22.5% $Pr_2O_3$ | Molycorp Inc. |
| samarium nitrate, aqueous solution $Sm(NO_3)_3 \cdot 6H_2O$ | 16.6% $Sm_2O_3$ | Molycorp Inc. |
| neodymium nitrate, aqueous solution $Nd(NO_3)_3 \cdot 6H_2O$ | 23% $Nd_2O_3$ | Molycorp Inc. |
| lanthanum nitrate, aqueous solution $La(NO_3)_3 \cdot 6H_2O$ | 28.5% $La_2O_3$ | Molycorp Inc. |
| gadolinium nitrate, aqueous solution $Gd(NO_3)_3 \cdot 5H_2O$ | 26.6% $Gd_2O_3$ | Molycorp Inc. |
| dysprosium nitrate, aqueous solution $Dy(NO_3)_3 \cdot 5H_2O$ | 15% $Dy_2O_3$ | Molycorp Inc. |
| erbium nitrate, aqueous solution $Er(NO_3)_3 \cdot 5H_2O$ | 22.5% $Er_2O_3$ | Molycorp Inc. |
| ytterbium nitrate, aqueous solution $Yb(NO_3)_3 \cdot 6H_2O$ | 22.5% $Yb_2O_3$ | Molycorp Inc. |
| magnesium nitrate, aqueous solution $Mg(NO_3)_3 \cdot 6H_2O$ | 11% MgO | Mallinckrodt Laboratory Chemicals, Phillipsburg, NJ |
| zinc nitrate, aqueous solution $Zn(NO_3)_3 \cdot 6H_2O$ | 21.4% ZnO | Mineral Research and Development, Charlotte, NC |
| Goethite ($\alpha$-FeOOH) | 4.5% $\alpha$-FeOOH | an aqueous-based suspension of iron oxyhydroxide ($\alpha$-feOOH), acicular particles with an average particle size of about 0.08 micrometer and a surface area of about 104.5 $m^2$ |

Examples 1–21 and Comparative Examples A–C

Example 1 was prepared by charging and continuously mixing into a 18.9 liter polyethylene lined steel vessel to form a dispersion: 6640 parts of deionized water at approximately 60° C., 160 parts of 16N analytical reagent grade nitric acid, and 3200 parts of alpha aluminum oxide monohydrate powder (commercially available under the trade designation "DISPERAL" from Sasol Limited, Johannesburg, South Africa.).

The resulting mixture was dispersed at high speed for 3 to 4 minutes using a Gifford-Wood Homogenizer Mixer (Greeco Corp., Hudson, N.H.). The resulting sol was poured evenly into four 22 cm by 33 cm by 5 cm PYREX trays and dried in a forced air oven at 100° C. for about 24 hours.

The resulting dried material was crushed using a "Braun" type UD pulverizer having a 1.1 mm gap between the steel plates to form particles. The particles were screened to provide 0.125 to 1 mm sized particles.

The screened particles were calcined at about 700° C. using a conventional rotary calciner which was a 23 cm diameter 4.3 meter long stainless steel tube having a 2.9 meter hot zone, the tube being inclined at 2.4 degrees with respect to the horizontal, and rotating at 7 rpm, to provide residence time therein of about 10 minutes. The calciner had a hot zone feed end temperature of 350° C. and exit end temperature of 700° C.

The resulting calcined particles were impregnated with an impregnation solution. About 180 ml of the impregnation solution was combined with about 300 grams of the calcined particles. The impregnation solution and the calcined particles were thoroughly mixed together to cause the solution to be impregnated into the calcined particles by capillary action. The impregnation solution was prepared by adding a sufficient amount of zinc nitrate, gadolinium nitrate, and yttrium nitrate to provide fired, sintered abrasive particles having the composition shown in Table 2, below.

TABLE 2

| Example | ZnO, wt % | $Gd_2O_3$, wt % | $Y_2O_3$, wt % | Sintened density g/cm$^3$ |
|---|---|---|---|---|
| 1 | 2.4 | 2.6 | 1.2 | 3.95 |
| 2 | 3.2 | 3.5 | 1.2 | 4.01 |
| 3 | 3.2 | 3.5 | 0 | 3.99 |
| 4 | 2.0 | 2.2 | 1.0 | 3.90 |
| 5 | 3.6 | 2.2 | 1.0 | 3.96 |
| 6 | 2.0 | 4.0 | 1.0 | 3.96 |
| 7 | 3.6 | 4.0 | 1.0 | 4.02 |
| 8 | 2.0 | 2.2 | 1.8 | 3.92 |
| 9 | 3.6 | 2.2 | 1.8 | 3.98 |
| 10 | 2.0 | 4.0 | 1.8 | 3.97 |
| 11 | 3.6 | 4.0 | 1.8 | 4.04 |
| 12 | 2.8 | 3.1 | 1.4 | 3.97 |
| 13 | 2.0 | 3.5 | 1.5 | 3.96 |
| 14 | 3.0 | 3.5 | 1.5 | 4.01 |
| 15 | 2.0 | 5.5 | 1.5 | 4.01 |
| 16 | 3.0 | 5.5 | 1.5 | 4.08 |
| 17 | 2.0 | 3.5 | 3.5 | 3.98 |
| 18 | 3.0 | 3.5 | 3.5 | 4.02 |
| 19 | 2.0 | 5.5 | 3.5 | 4.04 |
| 20 | 3.0 | 5.5 | 3.5 | 4.07 |
| 21 | 2.5 | 4.5 | 2.5 | 4.02 |
| Comp. I-A | 0 | 0 | 0 | 3.90 |
| Comp. I-B | | | | 3.92 |
| Comp. I-C | | | | 3.92 |

The resulting impregnated particles were dried such that the surfaces of the impregnated particles were relatively dry to the touch and then calcined as described above.

The calcined, impregnated particles were fed through a rotary kiln at 1406° C. The kiln included an 8.9 cm diameter, 1.22 meter long silicon carbide tube inclined at an angle of 4.4° C. to the horizontal. The kiln hot zone was about 33 cm. The tube was rotated at 6 rpm to provide a residence time in the kiln about 5 minutes. The resulting sintered abrasive particles exited the kiln into room temperature air where it was collected in a metal container and allowed to cool to room temperature.

Examples 2–21 and Comparative Examples I–A, I–B, and I–C were prepared as described for Example 1 with the exception that the compositions were adjusted as shown in Table 2 (above). Further, for Comparative Example 1 (Lots I–A, I–B, and I–C) the impregnation solution was formulated to provide the abrasive particles with 1.2% MgO, 2.4% $La_2O_3$, and 1.2% $Y_2O_3$.

The densities of the fired, sintered abrasive particles were determined using a Micromeritics (Norcross, Ga.) AccuPyc 1330 helium pycnometer. The results are reported in Table 2, above.

A portion of the sintered abrasive particles for several of the examples were incorporated into coated abrasive discs using conventional coated abrasive-making procedures. The sintered abrasive particles were graded to approximate an ANSI grade 36 or a FEPA grade P36. The selection of ANSI or FEPA grade was determined according to the particle yield from the pulverizing and initial screening steps. ANSI grade 36 was approximated by taking 16% by weight from abrasive particles that passed through a 25 mesh U.S. standard screen, but remained on a 30 mesh U.S. standard screen, 50% were abrasive particles that passed through a 30 mesh U.S. standard screen, but were retained on a 35 mesh U.S. standard screen, and the remaining 34% were abrasive particles that passed through a 35 mesh U.S. standard screen, but were retained on a 40 mesh U.S. standard screen. The graded sintered abrasive particles were bonded to vulcanized fiber backings using conventional calcium carbonate filled phenolic make resin and conventional cryolite filled phenolic size resins. The fiber discs were flexed prior to testing.

If the cured abrasive fiber disc was to be tested by abrading stainless steel, a supersize coating was applied over the size coat. The supersize coating comprised 29.6 parts of a diglycidyl ether of bisphenol A epoxy resin coatable from water (commercially available under the trade designation "CMD 35201" from Rhone-Poulenc, Jeffersontown, Ky.), 0.035 part of a 2-ethyl-4-methyl imidazole curing agent (commercially available under the trade designation "EMI-24" from Air Products) and 12 parts water, 55 parts potassium tetrafluoroborate, 2.3 parts iron oxide (colorant), and 0.78 part wetting agent. The supersize coated fiber disc was heated to cure the epoxy resin. For further details regarding this supersize, see copending application having U.S. Pat. No. 5,556,437 (Lee et al.), the disclosure of which is incorporated herein by reference for its teaching of making this supersize.

A coated abrasive disc was mounted on a beveled aluminum back-up pad and used to grind the faces 1.25 cm by 18 cm 1018 steel workpieces to demonstrate performance on a variety of substrates. The disc was driven at 5200 rpm while the portion of the disc overlaying the beveled edge of the back-up pad contacted the workpiece at with a force of about 6.0 kg, 8.2 kg, or 10.0 kg depending on the example. Each disc was used to grind a separate workpiece for a one-minute interval. The total cut was the summation of the amount of the workpiece removed for each of the one-minute intervals of the grinding test. The initial cut was the amount of metal removed in the first minute of grinding. The final cut was the amount of metal removed in the last minute of the test. There were two discs tested per example. The results are provided in Tables 3, 4, and 5, below.

TABLE 3

| | 1018 steel/6.0 kg load/20 minutes | | 1045 steel/16.0 kg load/20 minutes | |
|---|---|---|---|---|
| Example | Total cut, % of Comp. I-A | Final cut, % of Comp. I-A | Total cut, % of Comp. I-A | Final cut, % of Comp. I-A |
| 1 | 112 | 145 | 105 | 100 |
| 2 | 111 | 126 | 107 | 112 |

TABLE 3-continued

| | 1018 steel/6.0 kg load/20 minutes | | 1045 steel/16.0 kg load/20 minutes | |
|---|---|---|---|---|
| Example | Total cut, % of Comp. I-A | Final cut, % of Comp. I-A | Total cut, % of Comp. I-A | Final cut, % of Comp. I-A |
| 3 | 99 | 103 | 102 | 101 |
| Comp. I-A | 100 | 100 | 100 | 100 |

TABLE 4

| | 1018 steel/10.0 kg load/12 minutes | | | 1018 steel/6.0 kg load/20 minutes | | |
|---|---|---|---|---|---|---|
| Example | Initial cut, g | Final cut, g | Total cut, g | Initial cut, g | Final cut, g | Total cut, g |
| 4 | 127 | 65 | 1245 | 84 | 48 | 1577 |
| 5 | 139 | 86 | 1503 | 84 | 39 | 1543 |
| 6 | 130 | 20 | 1189 | 89 | 45 | 1713 |
| 7 | 142 | 80 | 1582 | 86 | 59 | 1826 |
| 8 | 142 | 60 | 1490 | 89 | 31 | 1450 |
| 9 | 143 | 94 | 1679 | 88 | 50 | 1783 |
| 10 | 152 | 126 | 1870 | 93 | 65 | 1981 |
| 11 | 147 | 89 | 1704 | 90 | 71 | 2042 |
| 12 | 159 | 83 | 1666 | 90 | 34 | 1638 |
| Comp. I-B | 145 | 62 | 1476 | 87 | 55 | 1854 |

TABLE 5

| | 1045 steel/10.0 kg load/P36/12 minutes | | | 1018 steel/10.0 kg load/12 minutes | | | 1018 steel/10.0 kg load/P36/20 minutes | | |
|---|---|---|---|---|---|---|---|---|---|
| Example | Initial cut, g | Final cut, g | Total cut, g | Initial cut, g | Final cut, g | Total cut, g | Initial cut, g | Final cut, g | Total cut, g |
| 13 | 103 | 49 | 774 | 138 | 110 | 1522 | 81 | 79 | 1875 |
| 14 | 95 | 40 | 706 | 140 | 93 | 1531 | 86 | 58 | 1709 |
| 15 | 100 | 44 | 768 | 140 | 87 | 1534 | 88 | 58 | 1778 |
| 16 | 100 | 40 | 782 | 140 | 106 | 1587 | 84 | 54 | 1754 |
| 17 | 96 | 42 | 736 | 130 | 105 | 1448 | 81 | 45 | 1550 |
| 18 | 93 | 52 | 789 | 127 | 88 | 1424 | 82 | 67 | 1673 |
| 19 | 94 | 42 | 737 | 129 | 70 | 1349 | 89 | 54 | 1672 |
| 20 | 99 | 53 | 807 | 138 | 98 | 1496 | 87 | 77 | 1842 |
| 21 | 98 | 34 | 684 | 145 | 65 | 1500 | 85 | 74 | 1823 |
| Comp. I-C | 95 | 38 | 698 | 140 | 69 | 1348 | 84 | 54 | 1614 |

Example 22 and Comparative Examples II–XVI

Example 22 and Comparative Examples II–XVI were prepared with several lanthanide, MgO, and/or ZnO formulations to compare fired densities. The mole ratios of components used were based on that of the abrasive particles marketed by 3M Company under the trade designation "CUBITRON 321" which contains, by weight, 1.2% MgO, 2.4% $La_2O_3$, 1.2% $Y_2O_3$, and 95.2% $Al_2O_3$. The mole ratios of the oxides were 0.030 mole MgO or ZnO mole to 0.0074 REO mole to 0.0053 $Y_2O_3$ to 0.934 mole $Al_2O_3$.

Example 22 and Comparative Examples II–XVI were prepared, and their densities measured, as described for Example 1, except the compositions were as shown in Table 6, below. The weight % of the various rare earth oxides was adjusted to provide equimolar compositions with respect to MgO and ZnO.

TABLE 6

| Example | REO | Weight Percent | | | | | Rare Earth Element Ionic Radius, Å | Density, g/cm³ |
|---|---|---|---|---|---|---|---|---|
| | | REO | MgO | ZnO | Y₂O₃ | Al₂O₃ | | |
| Comp. II | La₂O₃ | 2.40 | 1.20 | 0 | 1.20 | 95.20 | 1.016 | 3.90 |
| Comp. III | La₂O₃ | 2.37 | 0 | 2.39 | 1.19 | 94.05 | 1.016 | 3.89 |
| Comp. IV | Pr₂O₃ | 2.43 | 1.20 | 0 | 1.20 | 95.17 | 1.013 | 3.90 |
| Comp. V | Pr₂O₃ | 2.40 | 0 | 2.39 | 1.19 | 94.02 | 1.013 | 3.89 |
| Comp. VI | Nd₂O₃ | 2.48 | 1.20 | 0 | 1.20 | 95.12 | 0.995 | 3.90 |
| Comp. VII | Nd₂O₃ | 2.45 | 0 | 2.39 | 1.18 | 93.98 | 0.995 | 3.91 |
| Comp. VIII | Sm₂O₃ | 2.57 | 1.20 | 0 | 1.20 | 95.03 | 0.964 | 3.91 |
| Comp. IX | Sm₂O₃ | 2.53 | 0 | 2.39 | 1.18 | 93.89 | 0.964 | 3.94 |
| Comp. X | Dy₂O₃ | 2.74 | 1.20 | 0 | 1.20 | 94.86 | 0.950 | 3.90 |
| Comp. XI | Dy₂O₃ | 2.71 | 0 | 2.38 | 1.18 | 93.73 | 0.950 | 3.94 |
| Comp. XII | Gd₂O₃ | 2.66 | 1.20 | 0 | 1.20 | 94.94 | 0.936 | 3.91 |
| 22 | Gd₂O₃ | 2.63 | 0 | 2.38 | 1.18 | 93.81 | 0.936 | 3.96 |
| Comp. XIII | Er₂O₃ | 2.81 | 1.19 | 0 | 1.19 | 94.81 | 0.936 | 3.91 |
| Comp. XIV | Er₂O₃ | 2.77 | 0 | 2.38 | 1.18 | 93.67 | 0.881 | 3.94 |
| Comp. XV | Yb₂O₃ | 2.89 | 1.19 | 0 | 1.19 | 94.73 | 0.858 | 3.91 |
| Comp. XVI | Yb₂O₃ | 2.85 | 0 | 2.38 | 1.18 | 93.59 | 0.858 | 3.93 |

Figure 9:
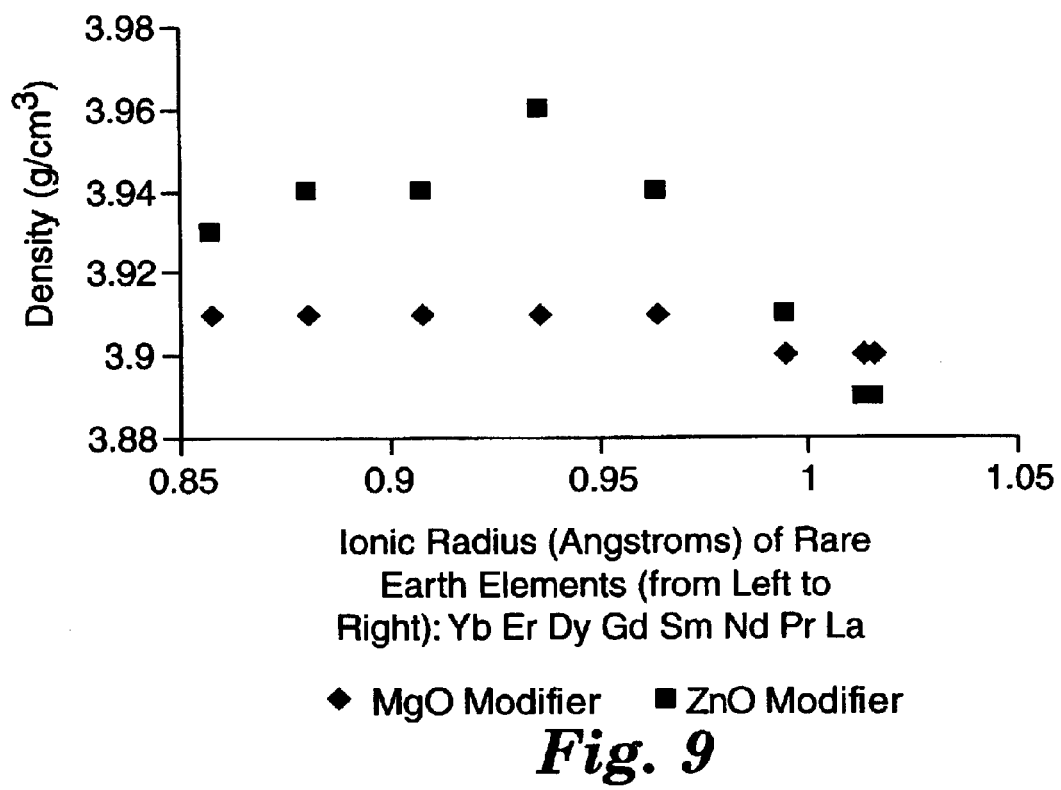
FIG. 9 is a plot of density versus ionic radius of various rare earth cations with both ZnO and MgO.

Referring to FIG. 9, for each example, the density was plotted against the ionic radius of the various rare earth oxides (REO) with both ZnO and MgO.

Example 23 and Comparative Examples XVII–XXXIII

For Examples 23 and Comparative Examples XVII–XXXIII abrasive particles having various molar amounts of ZnO/MgO and REO and were prepared. The compositions and densities are provided in Table 7, below.

Example 24 and Comparative Examples XXXIV–LI

For Example 24 and Comparative Examples XXXIV–LI abrasive particles having various molar ratios of REO to ZnO/MgO were made while holding the REO weight percent constant at 5%. The compositions and densities are provided in Table 8, below.

TABLE 7

| Example | Total mole % oxides other than Al₂O₃ | Weight Percent | | | | | | Density, g/cm³ |
|---|---|---|---|---|---|---|---|---|
| | | MgO | ZnO | La₂O₃ | Yb₂O₃ | Gd₂O₃ | Al₂O₃ | |
| Comp. XVII | 1% | 0.29 | 0 | 0.87 | 0 | 0 | 98.84 | 3.663 |
| Comp. XVIII | 1% | 0 | 0.58 | 0.86 | 0 | 0 | 98.56 | 3.716 |
| Comp. XIX | 1% | 0.29 | 0 | 0 | 1.06 | 0 | 98.65 | 3.538 |
| Comp. XX | 1% | 0 | 0.58 | 0 | 1.04 | 0 | 98.38 | 3.589 |
| Comp. XXI | 1% | 0.29 | 0 | 0 | 0 | 0.96 | 98.75 | 3.594 |
| Comp. XXII | 1% | 0 | 0.58 | 0 | 0 | 0.95 | 98.47 | 3.651 |
| Comp. XXIII | 8% | 2.3 | 0 | 7 | 0 | 0 | 90.7 | 3.698 |
| Comp. XXIV | 8% | 0 | 4.6 | 6.9 | 0 | 0 | 88.5 | 3.776 |
| Comp. XXV | 8% | 2.3 | 0 | 0 | 8.5 | 0 | 89.2 | 4.038 |
| Comp. XXVI | 8% | 0 | 4.6 | 0 | 8.4 | 0 | 87 | 4.124 |
| Comp. XXVIIA | 8% | 2.3 | 0 | 0 | 0 | 7.7 | 90 | 4.06 |
| 23 | 8% | 0 | 4.6 | 0 | 0 | 7.5 | 87.9 | 4.149 |
| Comp. XXVIII | 15% | 4.3 | 0 | 13.2 | 0 | 0 | 82.5 | 3.758 |
| Comp. XXIX | 15% | 0 | 8.6 | 12.8 | 0 | 0 | 78.6 | 4.048 |
| Comp. XXX | 15% | 4.3 | 0 | 0 | 15.9 | 0 | 79.8 | 4.195 |
| Comp. XXXI | 15% | 0 | 8.6 | 0 | 15.4 | 0 | 76 | 4.36 |
| Comp. XXXII | 15% | 4.3 | 0 | 0 | 0 | 14.4 | 81.3 | 3.999 |
| Comp. XXXIII | 15% | 0 | 8.6 | 0 | 0 | 14 | 77.4 | 4.06 |

TABLE 8

| Example | REO:ZnO/MgO mole ratio | MgO | ZnO | La$_2$O$_3$ | Yb$_2$O$_3$ | Gd$_2$O$_3$ | Al$_2$O$_3$ | Density, g/cm$^3$ |
|---|---|---|---|---|---|---|---|---|
| Comp. XXXIV | 1:2 | 1.24 | 0 | 5 | 0 | 0 | 93.76 | 3.87 |
| Comp. XXXV | — | 0 | 2.5 | 5 | 0 | 0 | 92.5 | 3.85 |
| Comp. XXXVI | — | 1.02 | 0 | 0 | 5 | 0 | 93.98 | 3.91 |
| Comp. XXXVIII | — | 0 | 2.06 | 0 | 5 | 0 | 92.94 | 3.95 |
| Comp. XXXIX | — | 1.11 | 0 | 0 | 0 | 5 | 93.89 | 3.97 |
| 24 | — | 0 | 2.24 | 0 | 0 | 5 | 92.76 | 4.01 |
| Comp. XXXX | 1:5 | 3.1 | 0 | 5 | 0 | 0 | 91.9 | 3.87 |
| Comp. XXXXI | — | −0 | 6.25 | 5 | 0 | 0 | 88.75 | 3.93 |
| Comp. XXXXIII | — | 2.55 | 0 | 0 | 5 | 0 | 92.45 | 3.96 |
| Comp. XXXXIV | — | 0 | 5.15 | 0 | 5 | 0 | 89.85 | 4.05 |
| Comp. XXXXV | — | 2.78 | 0 | 0 | 0 | 5 | 92.22 | 3.98 |
| 25 | — | 0 | 5.6 | 0 | 0 | 5 | 89.4 | 4.10 |
| Comp. XXXXVI | 1:8 | 4.94 | 0 | 5 | 0 | 0 | 90.06 | 3.78 |
| Comp. XXXXVII | — | 0 | 9.98 | 5 | 0 | 0 | 85.02 | 3.90 |
| Comp. XXXXVIII | — | 4.09 | 0 | 0 | 5 | 0 | 90.91 | 3.96 |
| Comp. XXXXIX | — | 0 | 8.25 | 0 | 5 | 0 | 86.75 | 4.12 |
| Comp. L | — | 4.44 | 0 | 0 | 0 | 5 | 90.56 | 3.97 |
| Comp. LI | — | 0 | 8.97 | 0 | 0 | 5 | 86.03 | 4.12 |

Example 26 and 27 and Comparative Examples LII–LXXXXVIII

Examples 26 and 27 and Comparative Examples LII–LXXXXVIII were prepared as described for Example 1, except the compositions were as shown in Table 9, below. For some, the mole ratio of REO to MgO or ZnO was 1:2.7; for some, the mole ratio of REO cations to MgO or ZnO was 1:8; for one, the mole ratio of REO to MgO was 1:4; and for one, the mole ratio of REO to ZnO was 1:2.2. The densities of Examples 26 and 27 and Comparative Examples LII–LXXXXVIII were measured as described for Example 1. The results are provided in Table 9, below.

TABLE 9

| Example | REO | REO:MgO/ZnO | REO | MgO | ZnO | Y$_2$O$_3$ | Al$_2$O$_3$ | Rare Earth Element Ionic Radius, Å | Density, g/cm$^3$ |
|---|---|---|---|---|---|---|---|---|---|
| Comp. LII | La$_2$O$_3$ | 1:2.7 | 3.56 | 1.19 | 0 | 1.19 | 94.06 | 1.016 | 3.92 |
| Comp. LIII | La$_2$O$_3$ | 1:2.7 | 3.51 | 0 | 2.36 | 1.18 | 92.95 | 1.016 | 3.91 |
| Comp. LIV | Pr$_2$O$_3$ | 1:2.7 | 3.60 | 1.19 | 0 | 1.19 | 94.02 | 1.013 | 3.92 |
| Comp. LV | Pr$_2$O$_3$ | 1:2.7 | 3.56 | 0 | 2.36 | 1.18 | 92.90 | 1.013 | 3.90 |
| Comp. LVI | Nd$_2$O$_3$ | 1:2.7 | 3.57 | 1.19 | 0 | 1.19 | 93.95 | 0.995 | 3.94 |
| Comp. LVII | Nd$_2$O$_3$ | 1:2.7 | 3.63 | 0 | 2.36 | 1.17 | 92.84 | 0.995 | 3.94 |
| Comp. LVIII | Sm$_2$O$_3$ | 1:2.7 | 3.81 | 1.18 | 0 | 1.18 | 93.83 | 0.964 | 3.95 |
| Comp. LIX | Sm$_2$O$_3$ | 1:2.7 | 3.75 | 0 | 2.36 | 1.17 | 92.72 | 0.964 | 3.98 |
| Comp. LX | Dy$_2$O$_3$ | 1:2.7 | 4.05 | 1.18 | 0 | 1.18 | 93.59 | 0.908 | 3.94 |
| Comp. LXI | Dy$_2$O$_3$ | 1:2.7 | 4.01 | 0 | 2.35 | 1.16 | 92.48 | 0.908 | 3.98 |
| Comp. LXII | Gd$_2$O$_3$ | 1:2.7 | 3.94 | 1.18 | 0 | 1.18 | 93.70 | 0.936 | 3.95 |
| 26 | Gd$_2$O$_3$ | 1:2.7 | 3.89 | 0 | 2.35 | 1.17 | 92.59 | 0.936 | 4.00 |
| Comp. LXIII | Er$_2$O$_3$ | 1:2.7 | 4.16 | 1.17 | 0 | 1.17 | 93.50 | 0.881 | 3.95 |
| Comp. LXIV | Er$_2$O$_3$ | 1:2.7 | 4.10 | 0 | 2.35 | 1.16 | 92.39 | 0.881 | 3.98 |
| Comp. LXV | Yb$_2$O$_3$ | 1:2.7 | 4.34 | 1.17 | 0 | 1.17 | 93.32 | 0.858 | 3.95 |
| Comp. LXVI | Yb$_2$O$_3$ | 1:2.7 | 4.21 | 0 | 2.35 | 1.16 | 92.28 | 0.858 | 3.98 |
| Comp. LXVII | La$_2$O$_3$ | 1:8 | 1.2 | 1.2 | 0 | 1.2 | 96.4 | 1.016 | 3.86 |
| Comp. LXVIII | La$_2$O$_3$ | 1:8 | 1.19 | 0 | 2.39 | 1.19 | 95.23 | 1.016 | 3.88 |
| Comp. LXIX | Pr$_2$O$_3$ | 1:8 | 1.22 | 1.2 | 0 | 1.2 | 96.38 | 1.013 | 3.86 |
| Comp. LXX | Pr$_2$O$_3$ | 1:8 | 1.2 | 0 | 2.39 | 1.19 | 95.22 | 1.013 | 3.88 |
| Comp. LXXI | Nd$_2$O$_3$ | 1:8 | 1.25 | 1.2 | 0 | 1.2 | 96.36 | 0.995 | 3.86 |
| Comp. LXXII | Nd$_2$O$_3$ | 1:8 | 1.23 | 0 | 2.39 | 1.18 | 95.2 | 0.995 | 3.88 |
| Comp. LXXIII | Sm$_2$O$_3$ | 1:8 | 1.29 | 1.2 | 0 | 1.2 | 96.31 | 0.964 | 3.87 |
| Comp. LXXIV | Sm$_2$O$_3$ | 1:8 | 1.27 | 0 | 2.39 | 1.18 | 95.15 | 0.964 | 3.88 |
| Comp. LXXV | Dy$_2$O$_3$ | 1:8 | 1.37 | 1.2 | 0 | 1.2 | 96.23 | 0.908 | 3.86 |
| Comp. LXXVI | Dy$_2$O$_3$ | 1:8 | 1.36 | 0 | 2.38 | 1.18 | 95.08 | 0.908 | 3.87 |
| Comp. LXXVII | Gd$_2$O$_3$ | 1:8 | 1.33 | 1.2 | 0 | 1.2 | 96.27 | 0.936 | 3.87 |
| Comp. LXXVIII | Gd$_2$O$_3$ | 1:8 | 1.32 | 0 | 2.38 | 1.18 | 95.12 | 0.936 | 3.90 |
| Comp. LXXIX | Er$_2$O$_3$ | 1:8 | 1.41 | 1.19 | 0 | 1.19 | 96.21 | 0.881 | 3.86 |
| Comp. LXXX | Er$_2$O$_3$ | 1:8 | 1.39 | 0 | 2.38 | 1.18 | 95.05 | 0.881 | 3.86 |
| Comp. LXXXI | Yb$_2$O$_3$ | 1:8 | 1.45 | 1.19 | 0 | 1.19 | 96.17 | 0.858 | 3.86 |
| Comp. LXXXII | Yb$_2$O$_3$ | 1:8 | 1.43 | 0 | 2.38 | 1.18 | 95.01 | 0.858 | 3.85 |
| Comp. LXXXIII | La$_2$O$_3$ | 1:2.7 | 3.56 | 1.19 | 0 | 0 | 95.25 | 1.016 | 3.85 |
| Comp. LXXXIV | La$_2$O$_3$ | 1:2.7 | 3.51 | 0 | 2.36 | 0 | 94.13 | 1.016 | 3.84 |
| Comp. LXXXV | Pr$_2$O$_3$ | 1:2.7 | 3.6 | 1.19 | 0 | 0 | 95.21 | 1.013 | 3.87 |
| Comp. LXXXVI | Pr$_2$O$_3$ | 1:2.7 | 3.56 | 0 | 2.36 | 0 | 94.08 | 1.013 | 3.86 |
| Comp. LXXXVII | Nd$_2$O$_3$ | 1:2.7 | 3.67 | 1.19 | 0 | 0 | 95.14 | 0.995 | 3.89 |

TABLE 9-continued

| Example | REO | REO:MgO/ZnO | Weight Percent | | | | | Rare Earth Element Ionic Radius, Å | Density, g/cm³ |
| | | | REO | MgO | ZnO | $Y_2O_3$ | $Al_2O_3$ | | |
| --- | --- | --- | --- | --- | --- | --- | --- | --- | --- |
| Comp. LXXXVIII | $Nd_2O_3$ | 1:2.7 | 3.63 | 0 | 2.36 | 0 | 94.01 | 0.995 | 3.89 |
| Comp. LXXXIX | $Sm_2O_3$ | 1:2.7 | 3.81 | 1.18 | 0 | 0 | 95.01 | 0.964 | 3.93 |
| Comp. LXXXX | $Sm_2O_3$ | 1:2.7 | 3.75 | 0 | 2.36 | 0 | 93.89 | 0.964 | 3.94 |
| Comp. LXXXXI | $Dy_2O_3$ | 1:2.7 | 4.05 | 1.18 | 0 | 0 | 94.77 | 0.908 | 3.92 |
| Comp. LXXXXII | $Dy_2O_3$ | 1.2.7 | 4.01 | 0 | 2.35 | 0 | 93.64 | 0.908 | 3.95 |
| Comp. LXXXXIII | $Gd_2O_3$ | 1:2.7 | 3.94 | 1.18 | 0 | 0 | 94.88 | 0.936 | 3.93 |
| 27 | $Gd_2O_3$ | 1:2.7 | 3.89 | 0 | 2.35 | 0 | 93.76 | 0.936 | 3.99 |
| Comp. LXXXXIV | $Er_2O_3$ | 1:2.7 | 4.16 | 1.17 | 0 | 0 | 94.67 | 0.881 | 3.92 |
| Comp. LXXXXV | $Er_2O_3$ | 1:2.7 | 4.1 | 0 | 2.35 | 0 | 93.55 | 0.881 | 3.94 |
| Comp. LXXXXVI | $Yb_2O_3$ | 1:2.7 | 4.34 | 1.17 | 0 | 0 | 94.49 | 0.858 | 3.91 |
| Comp. LXXXXVII | $Yb_2O_3$ | 1:2.7 | 4.21 | 0 | 2.35 | 0 | 93.44 | 0.858 | 3.91 |
| Comp. LXXXXVIII | $La_2O_3$ | 1:4 | 2.4 | 1.2 | 0 | 1.2 | 95.2 | 1.016 | 3.91 |
| 28 | $Gd_2O_3$ | 1:2.2 | 4.2 | 0 | 2.1 | 1.9 | 91.8 | 0.936 | 3.98 |

Figure 7:
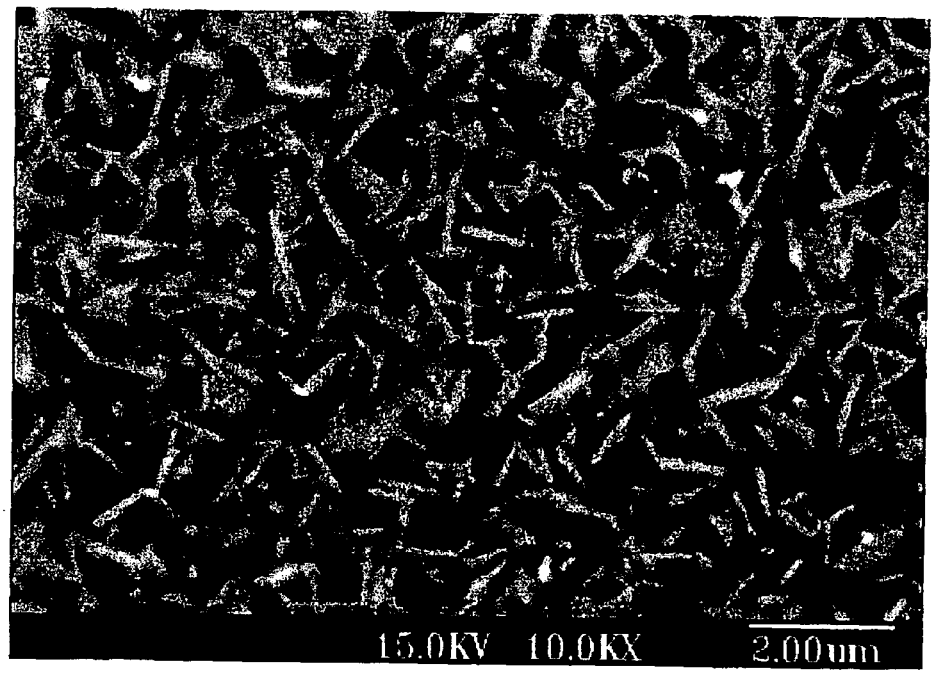
FIG. 7 is a Scanning Electron Microscopy photomicrograph in backscatter mode of the microstructure of an Example 26 abrasive particle.
Figure 8:
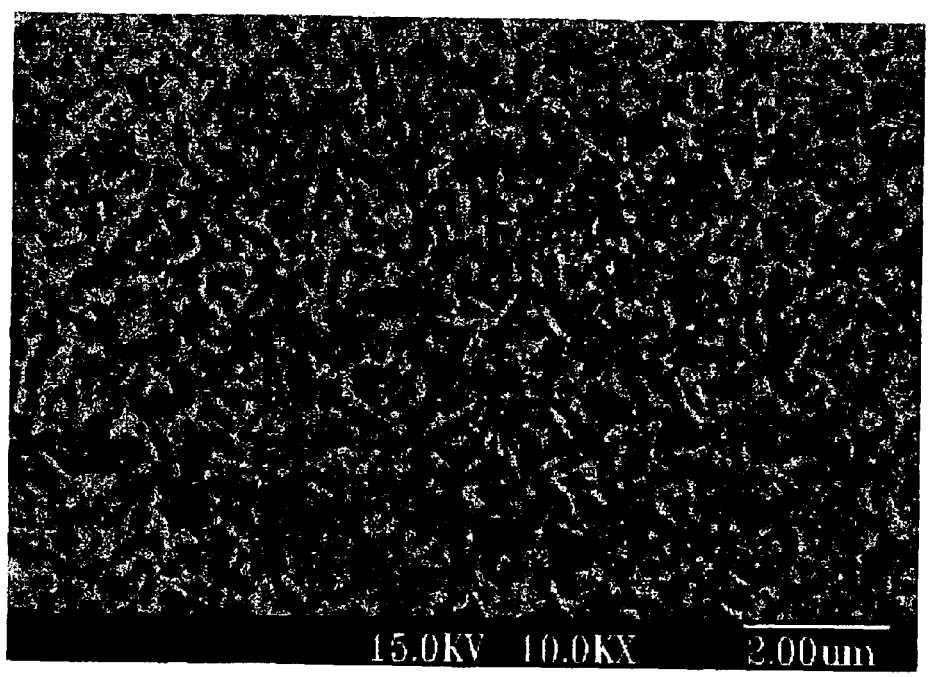
FIG. 8 is a Scanning Electron Microscopy photomicrograph in backscatter mode of the microstructure of a Comparative Example LII abrasive particle.

FIGS. 7 and 8 are scanning electron photomicrographs of polished cross-sections of Example 26 and Comparative Example LII abrasive particles, respectively. These polished samples were prepared by mounting the abrasive particles in mounting resin (obtained under the trade designation "TRANSOPTIC POWDER" from Buehler, Lake Bluff, Ill.) in a cylinder of resin about 2.5 cm in diameter and about 1.9 cm high. The mounted section was polished using conventional polishing techniques with a polisher (obtained from Buehler, Lake Bluff, Ill. under the trade designation "ECOMET 3"). The sample was polished for about 3 minutes with a 70 micrometer diamond wheel, followed by 5 minutes of polishing with each of 45, 30, 15, 9, 3, and 1-micrometer slurries. The mounted and polished sample was sputtered with a thin layer of gold-palladium and viewed using a scanning electron microscopy (JEOL SEM Model JSM 840A). An image was taken at 10,000× and printed to provide a photomicrograph about 120 mm long by about 90 mm wide.

Figure 10:
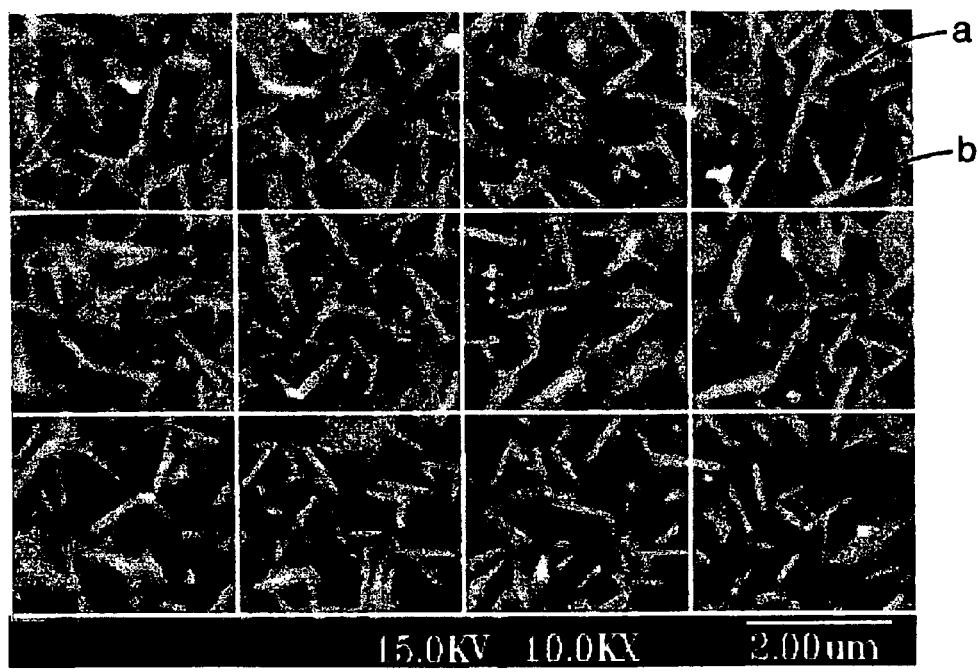
FIG. 10 is a version of FIG. 7 used to determine the average size of platelets in the Example 26 abrasive particle.

This image was divided into 12 squares each about 30 mm by about 30 mm. For Example 26, see FIG. 10. Each square was visually inspected and two representative platelets selected in each square for measurement (i.e., length and thickness). For one of squares in FIG. 10, platelets "a" and "b" were used. Only those platelets having two discernable ends are used for measurement. If there were more than two such platelets on a square, the two platelets in that square selected for determining the average size were the two platelets closest in size to the average of the platelets in the square having two discernable ends. Twenty four platelets were measured and averaged to provide the reported average length and thickness values. Further, the platelet sizes reported are for the edge faces only as it is believed that the polished surfaces and random platelet orientation do not give reliable views of the broader platelet faces. X-ray powder diffraction was used to determined that the platelets for Example 26 comprised $GdZnAl_{11}O_{19}$ magnetoplumbite, and for Comparative Example LII, comprised $LaMgAl_{11}O_{19}$ magnetoplumbite.

While containing the same mole % of magnetoplumbite, it is readily apparent for FIGS. 7 and 8, the platelets of Example 26 were much larger, and less numerous than those of Comparative Example LII. The platelets of the Example 26 sample were on average about 0.12 micrometer by about 1.12 micrometer, and for Comparative Example LII were on average about 0.09 micrometer by about 0.69 micrometer.

The mounted samples were also used to determine the average microhardnesses of the Example 26 and Comparative Example LII abrasive particles. The microhardness measurements were made using a conventional microhardness tester (obtained under the trade designation "MITUTOYO MVK-VL" from Mitutoyo Corporation, Tokyo, Japan) fitted with a Vickers indenter using a 500-gram indent load. The microhardness measurements were made according to the guidelines stated in ASTM Test Method E384 Test Methods for Microhardness of Materials (1991), the disclosure of which is incorporated herein by reference. The average hardness for the Example 26 and Comparative Example LII abrasive particles were 17.2 GPa and at 18.4 GPa, respectively.

The grinding performance of Examples 28 and Comparative Example LXXXXVIII were evaluated on 1018 mild steel at loads of both 6.0 kg and 8.2 kg as described for Examples 1–21 and Comparative Examples A–1. The grinding results are provided in Table 10, below.

TABLE 10

| | 1018 steel/6.0 kg load/20 minutes | | | 1018 steel/8.2 kg load/15 minutes | | |
| --- | --- | --- | --- | --- | --- | --- |
| Example | Initial cut, g | Final cut, g | Total cut, g | Initial cut, g | Final cut, g | Total cut, g |
| Comp. LXXXXVIII | 68 | 58 | 1506 | 91 | 69 | 1360 |
| 28 | 89 | 88 | 1985 | 113 | 97 | 1809 |

Comparative Examples LXXXXIX–CVI

Comparative Examples LXXXXIX–CVI were prepared, and densities measured, as described for Example 1, except a goethite nucleating agent was used and the compositions were as shown in Table 11, below, wherein the amount of goethite nucleating agent is expressed as $Fe_2O_3$.

TABLE 11

| Example | $Fe_2O_3$, weight-% | $La_2O_3$, weight-% | $Gd_2O_3$, weight-% | MgO, weight-% | ZnO, weight-% | $Y_2O_3$, weight-% | $Al_2O_3$, weight-% | Density, g/cm³ |
|---|---|---|---|---|---|---|---|---|
| Comp. LXXXXIX | 1.4 | 2.4 | 0 | 1.2 | 0 | 1.2 | 93.8 | 3.95 |
| Comp. C | 1.4 | 0 | 2.6 | 0 | 2.4 | 1.2 | 92.4 | 4.03 |
| Comp. CI | 1.4 | 0 | 2.6 | 1.2 | 0 | 1.2 | 93.6 | 4.02 |
| Comp. CII | 1.4 | 2.4 | 0 | 0 | 2.4 | 1.2 | 92.6 | 3.95 |
| Comp. CIII | 1.4 | 2.4 | 0 | 1.2 | 0 | 0 | 95.0 | 3.97 |
| Comp. CIV | 1.4 | 0 | 2.6 | 0 | 2.4 | 0 | 93.6 | 4.01 |
| Comp. CV | 1.4 | 0 | 2.6 | 1.2 | 0 | 0 | 94.8 | 4.00 |
| Comp. CVI | 1.4 | 2.4 | 0 | 0 | 2.4 | 0 | 93.8 | 4.03 |

Examples 29 and 30

Examples 29 and 30 were prepared, and densities measured, as described for Example 1, except the compositions were as shown in Table 12, below.

TABLE 12

| Example | $Dy_2O_3$, weight-% | $Gd_2O_3$, weight-% | MgO, weight-% | ZnO, weight-% | $Y_2O_3$, weight-% | $Al_2O_3$, weight-% | Density, g/cm³ |
|---|---|---|---|---|---|---|---|
| 29 | 1.36 | 1.32 | 0 | 2.38 | 1.20 | 93.74 | 3.95 |
| 30 | 0 | 2.65 | 0 | 2.40 | 1.20 | 93.75 | 3.96 |

Example 31 and Comparative Example CVII

Example 31 and Comparative Example CVII were prepared, and densities measured, as described for Example 1, except the compositions and sintering temperatures were as shown in Table 13, below.

TABLE 13

| Example | Sintering Temperature, °C. | Weight Percent | | | | | | Density, g/cm³ |
|---|---|---|---|---|---|---|---|---|
| | | $La_2O_3$ | $Gd_2O_3$ | MgO | ZnO | $Y_2O_3$ | $Al_2O_3$ | |
| Comp. CVII | 1415 | 2.4 | 0 | 1.2 | 0 | 1.2 | 95.2 | 3.92 |
| | 1400 | | | | | | | 3.92 |
| | 1380 | | | | | | | 3.91* |
| | 1370 | | | | | | | 3.88 |
| | 1360 | | | | | | | 3.80 |
| | 1350 | | | | | | | |
| | 1340 | | | | | | | |
| | 1330 | | | | | | | |
| 31 | 1415 | 0 | 4.2 | 0 | 2.1 | 1.9 | 91.8 | 3.99 |
| | 1400 | | | | | | | 3.99 |
| | 1380 | | | | | | | 3.99 |
| | 1370 | | | | | | | 3.99 |
| | 1360 | | | | | | | 3.98 |
| | 1350 | | | | | | | 3.98* |
| | 1340 | | | | | | | 3.96 |
| | 1330 | | | | | | | 3.92 |

*denotes no further change in density observed.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Sintered alpha alumina-based abrasive particle comprising alpha alumina, and, by weight, $Gd_2O_3$ in a range from 1 to 15 percent, and ZnO in a range from 0.2 to 8 percent, based on the total metal oxide content of the abrasive particle, and a $Gd_2O_3$ to ZnO molar ratio in a range from 2:1 to 1:5, wherein less than 0.05 volume percent of the alpha alumina present in the sintered alpha alumina-based abrasive particle was nucleated with a nucleating agent.

2. The sintered alpha alumina-based abrasive particle according to claim 1, wherein the $Gd_2O_3$ to ZnO molar ratio is a range from 1:2 to 1:4.

3. The sintered alpha alumina-based abrasive particle according to claim 2, wherein less than 0.025 volume percent of the alpha alumina present in the sintered alpha alumina-based abrasive particle was nucleated with a nucleating agent.

4. The sintered alpha alumina-based abrasive particle according to claim 1, wherein the $Gd_2O_3$ is present in a range from 2 to 8 percent by weight, and the ZnO in a range from 1 to 5 percent by weight, based on the total metal oxide content of the abrasive particle.

5. The sintered alpha alumina-based abrasive particle according to claim 4, wherein less than 0.025 volume percent of the alpha alumina present in the sintered alpha alumina-based abrasive particle was nucleated with a nucleating agent.

6. The sintered alpha alumina-based abrasive particle according to claim 4, wherein the $Gd_2O_3$ to ZnO molar ratio is a range from 1:2 to 1:4.

7. The sintered alpha alumina-based abrasive particle according to claim 6, wherein less than 0.025 volume percent of the alpha alumina present in the sintered alpha alumina-based abrasive particle was nucleated with a nucleating agent.

8. The sintered alpha alumina-based abrasive particle according to claim 4 wherein the $Al_2O_3$ is present in a range from 55 to 97 percent by weight, based on the total metal oxide content of the abrasive particle.

9. The sintered alpha alumina-based abrasive particle according to claim 8, wherein less than 0.025 volume percent of the alpha alumina present in the sintered alpha alumina-based abrasive particle was nucleated with a nucleating agent.

10. The sintered alpha alumina-based abrasive particle according to claim 1, wherein the alpha alumina of the abrasive particle has an average crystallite size in a range from 1 micrometer to 10 micrometers.

11. The sintered alpha alumina-based abrasive particle according to claim 1, wherein at least a portion of the rare earth oxide are present as magnetoplumbite platelets having an average longitudinal size in a range from 0.8 micrometer to 2 micrometers and an average cross-sectional thickness in a range from 0.1 micrometer to 0.15 micrometer.

12. The sintered alpha alumina-based abrasive particle according to claim 1 further comprising metal oxide selected from the group consisting of: chromium oxide, cobalt oxide, ferric oxide, hafnium oxide, lithium oxide, magnesium oxide, manganese oxide, nickel oxide, titanium oxide, yttrium oxide, zirconium oxide, and combinations thereof.

13. The sintered alpha alumina-based abrasive particle according to claim 1, wherein less than 0.025 volume percent of the alpha alumina present in the sintered alpha alumina-based abrasive particle was nucleated with a nucleating agent.

14. A plurality of abrasive particles having an abrasive industry specified nominal grade, wherein at least a portion of the plurality of abrasive particles are abrasive particles according to claim 13.

15. An abrasive article comprising a binder and a plurality of abrasive particles according to claim 13 secured within the article by the binder.

16. A plurality of abrasive particles having an abrasive industry specified nominal grade, wherein at least a portion of the plurality of abrasive particles are abrasive particles according to claim 1.

17. The plurality of abrasive particles according to claim 16 wherein the abrasive industry specified nominal grade is selected from the group consisting of ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

18. The plurality of abrasive particles according to claim 16 wherein the abrasive industry specified nominal grade is selected from the group consisting of P8, P12, P16, P24, P36, P40, P50, P60, P80, P100, P120, P150, P180, P220, P320, P400, P500, P600, P800, P1000, and P1200.

19. The plurality of abrasive particles according to claim 16 wherein the abrasive industry specified nominal grade is selected from the group consisting of JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000.

20. The sintered alpha alumina-based abrasive particle according to claim 1 wherein the $Al_2O_3$ is present in a range from 55 to 97 percent by weight, based on the total metal oxide content of the abrasive particle.

21. The sintered alpha alumina-based abrasive particle according to claim 20, wherein less than 0.025 volume percent of the alpha alumina present in the sintered alpha alumina-based abrasive particle was nucleated with a nucleating agent.

22. An abrasive article comprising a binder and a plurality of abrasive particles according to claim 1 secured within the article by the binder.

23. The abrasive article according to claim 22 wherein the abrasive article is a bonded abrasive article, a non-woven abrasive article, a coated abrasive article, or an abrasive brush.

24. The abrasive article according to claim 22 wherein the abrasive article is a grinding wheel.

25. A method for making sintered alpha alumina-based abrasive particles, the method comprising:
preparing a dispersion by combining components comprising liquid medium, peptizing agent, boehmite, a $Gd_2O_3$ source, and a ZnO source;
converting the dispersion to particulate alpha alumina-based abrasive particle precursor material; and
sintering the particulate alpha alumina-based abrasive particle precursor material to provide the sintered alpha alumina-based abrasive particles according to claim 1.

26. The method according to claim 25 wherein the $Gd_2O_3$ source is a gadolinium salt, and wherein the ZnO source includes a zinc salt.

27. A method for making sintered alpha alumina-based abrasive particles, the method comprising:
preparing a dispersion by combining components comprising liquid medium, peptizing agent and boehmite;
converting the dispersion to particulate alpha alumina-based abrasive particle precursor material;
calcining the particulate alpha alumina-based abrasive particle precursor material to provide first calcined alpha alumina-based abrasive particle precursor particles;
impregnating the first calcined particles with an impregnation composition comprising liquid medium to provide impregnated alpha alumina-based abrasive particle precursor particles;
calcining the impregnated alpha alumina-based abrasive particle precursor particles to provide second calcined alpha alumina-based abrasive particle precursor particles; and
sintering the second calcined particles to provide the sintered alpha alumina-based abrasive particles according to claim 1,
wherein at least one of the dispersion or the impregnation composition comprise a $Gd_2O_3$ source and a ZnO source.

28. The method according to claim 27 wherein the $Gd_2O_3$ source is a gadolinium salt, and wherein the ZnO source includes a zinc salt.

29. A method for making an abrasive article, the method comprising:
preparing a dispersion by combining components comprising liquid medium, peptizing agent, boehmite, a $Gd_2O_3$ source, and a ZnO source;
converting the dispersion to particulate alpha alumina-based abrasive particle precursor material;
sintering the precursor material to provide the sintered alpha alumina-based abrasive particles according to claim 1; and
combining at least a plurality of the sintered alpha alumina-based abrasive particles with binder to provide an abrasive article.

30. The method according to claim 29 wherein combining at least a plurality of the alpha alumina-based ceramic abrasive particle with binder includes combining fused alumina abrasive particle with the binder.

31. A method for making an abrasive article, the method comprising:

preparing a dispersion by combining components comprising liquid medium, peptizing agent and boehmite;

converting the dispersion to particulate alpha alumina-based abrasive particle precursor material;

calcining the particulate alpha alumina-based abrasive particle precursor material to provide first calcined alpha alumina-based abrasive particle precursor particles;

impregnating the first calcined particles with an impregnation composition comprising liquid medium to provide impregnated alpha alumina-based abrasive particle precursor particles;

calcining the impregnated alpha alumina-based abrasive particle precursor particles to provide second calcined alpha alumina-based abrasive particle precursor particles;

sintering the second calcined particles to provide sintered alpha alumina-based abrasive particles according to claim 1; and combining at least a plurality of the sintered alpha alumina-based abrasive particles with binder to provide an abrasive article, wherein at least one of the dispersion or the impregnation composition comprise a $Gd_2O_3$ source and a ZnO source.

32. The method according to claim 31 wherein combining at least a plurality of the alpha alumina-based ceramic abrasive particle with binder includes combining fused alumina abrasive particle with the binder.

33. A method of abrading a surface, the method comprising:

providing an abrasive article comprising a binder and a plurality of abrasive particles, wherein at least a portion of the abrasive particles are abrasive particles according to claim 1;

contacting at least one of the abrasive particles comprising the alpha alumina, the $Gd_2O_3$, and the ZnO with a surface of a workpiece; and moving at least one of the contacted abrasive particles comprising the alpha alumina, the $Gd_2O_3$, and the ZnO or the contacted surface to abrade at least a portion of the surface with the contacted abrasive particle comprising the alpha alumina, the $Gd_2O_3$, and the ZnO.

34. The method according to claim 33 wherein the surface is selected from the group of metals consisting of aluminum, carbon steel, mild steel, tool steel, stainless steel, hardened steel, titanium, and wood.

35. The method according to claim 33 wherein the surface is selected from the group of metals consisting of aluminum, 1018 mild steel and 1045 mild steel.

36. The sintered alpha alumina-based abrasive particle according to claim 1, wherein less than 0.01 volume percent of the alpha alumina present in the sintered alpha alumina-based abrasive particle was nucleated with a nucleating agent.

* * * * *

UNITED STATES PATENT AND TRADEMARK OFFICE
CERTIFICATE OF CORRECTION

PATENT NO.    : 6,802,878 B1
DATED         : October 12, 2004
INVENTOR(S)   : Monroe, Larry D.

It is certified that error appears in the above-identified patent and that said Letters Patent is hereby corrected as shown below:

Column 3,
Line 15, delete "60)" and insert -- 60% --.

Column 6,
Line 8, delete "$(ON_3)_3$" and insert -- $(NO_3)_3$ --.

Column 7,
Line 59, delete "ZR10/2020" and insert -- ZR10/20 --.

Column 9,
Line 4, delete "Lttleford-Day" and insert -- Littleford-Day --.

Column 11,
Line 40, after "thereof" insert -- . --.

Column 14,
Line 14, after "even" delete "0.15" and insert -- 0.1 --.

Column 16,
Line 45, delete "litanates" and insert -- titanates --.

Column 21,
Table 1, line 38, delete "$Mg(NO_3)_3.6H_2O$" and insert -- $Mg(NO_3)_2.6H_2O$ --.
Table 1, line 40, delete "$Zn(NO_3)_3.6H_2O$" and insert -- $Zn(NO_3)_2.6H_2O$ --.

Column 22,
Table 2, line 24, delete "Sintened density" and insert -- Sintered density, --.

Column 23,
Table 3, line 60, delete "16.0 kg" and insert -- 6.0 kg --.

UNITED STATES PATENT AND TRADEMARK OFFICE
CERTIFICATE OF CORRECTION

PATENT NO. : 6,802,878, B1
DATED : October 12, 2004
INVENTOR(S) : Monroe, Larry D.

It is certified that error appears in the above-identified patent and that said Letters Patent is hereby corrected as shown below:

Column 24,
Talbe 3, line 3, delete "16.0 kg" and insert -- 6.0 kg --.

Column 29,
Table 9, Column 3, Row 5, delete "1.2.7" and insert -- 1:2.7 --.

Signed and Sealed this

Seventeenth Day of May, 2005

JON W. DUDAS
*Director of the United States Patent and Trademark Office*